US010356089B2

(12) United States Patent
Chang et al.

(10) Patent No.: US 10,356,089 B2
(45) Date of Patent: Jul. 16, 2019

(54) ELECTRONIC DEVICE FOR PROCESSING BIOMETRIC INFORMATION AND METHOD OF CONTROLLING SAME

(71) Applicant: SAMSUNG ELECTRONICS CO., LTD., Suwon-si, Gyeonggi-do (KR)

(72) Inventors: Moon-Soo Chang, Yongin-si (KR); Hak-Joo Kim, Yongin-si (KR); Sang-Ho Park, Anyang-si (KR); Yong-Jun Park, Suwon-si (KR); Jong-Hoon Park, Suwon-si (KR); In-Jun Son, Suwon-si (KR); Yang-Soo Lee, Yongin-si (KR); Hyung-Joo Cho, Suwon-si (KR); Ho-Dong Jwa, Suwon-si (KR); Woo-Young Choi, Hwaseong-si (KR); Dong-Hyun Yeom, Bucheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 193 days.

(21) Appl. No.: 15/381,431

(22) Filed: Dec. 16, 2016

(65) Prior Publication Data

US 2017/0185762 A1    Jun. 29, 2017

(30) Foreign Application Priority Data

Dec. 24, 2015 (KR) .......................... 10-2015-0186804

(51) Int. Cl.
*H04L 29/06* (2006.01)
*G06F 21/32* (2013.01)
(Continued)

(52) U.S. Cl.
CPC .......... *H04L 63/0861* (2013.01); *G06F 21/32* (2013.01); *G06K 9/00375* (2013.01);
(Continued)

(58) Field of Classification Search
CPC . H04L 63/0861; H04L 9/3231; H04L 63/082; H04L 63/08; H04L 63/0876; H04L 63/0414; H04W 12/06; G06F 21/32
See application file for complete search history.

(56) References Cited

U.S. PATENT DOCUMENTS 6,332,193 B1 * 12/2001 Glass ...................... G06F 21/32
713/170
6,636,620 B1 * 10/2003 Hoshino ................. G06F 3/021
340/5.53

(Continued)

FOREIGN PATENT DOCUMENTS

EP    1840794    * 3/2007
EP    1 840 794    10/2007

(Continued)

OTHER PUBLICATIONS

Search Report and Written Opinion dated Mar. 27, 2017 in counterpart International Patent Application No. PCT/KR2016/014328.

(Continued)

*Primary Examiner* — Jung W Kim
*Assistant Examiner* — Carlos M De Jesus Lassala
(74) *Attorney, Agent, or Firm* — Nixon & Vanderhye P.C.

(57) ABSTRACT

An electronic device includes a processor and a memory functionally connected to the processor. The electronic device acquires user's biometric information through a biometric sensor, determines virtual biometric information corresponding to the acquired biometric information, and transmits the virtual biometric information to an external electronic device through communication circuitry. The electronic device may include the biometric sensor, the communication circuitry, and the memory may be electri- (Continued)

cally connected to the biometric sensor and the communication module and store instructions to be executed by the processor.

19 Claims, 28 Drawing Sheets

(51) Int. Cl.
*G06K 9/00* (2006.01)
*H04W 12/06* (2009.01)
*H04W 88/02* (2009.01)

(52) U.S. Cl.
CPC ...... *H04L 63/0414* (2013.01); *H04L 63/0876* (2013.01); *H04W 12/06* (2013.01); *H04L 63/08* (2013.01); *H04W 88/02* (2013.01)

(56) References Cited

U.S. PATENT DOCUMENTS

| | | | |
|---|---|---|---|
| 6,877,097 B2 | 4/2005 | Hamid et al. | |
| 2003/0215114 A1* | 11/2003 | Kyle | G06F 21/32 382/115 |
| 2007/0055166 A1 | 3/2007 | Patil | |
| 2007/0186116 A1 | 8/2007 | Clemmensen et al. | |
| 2007/0198435 A1* | 8/2007 | Siegal | G06F 21/32 705/67 |
| 2008/0013795 A1* | 1/2008 | Ito | G06K 9/00885 382/115 |
| 2010/0205658 A1* | 8/2010 | Griffin | G06F 21/32 726/5 |
| 2010/0303311 A1* | 12/2010 | Shin | G06K 9/00013 382/124 |
| 2011/0129128 A1* | 6/2011 | Makimoto | G06K 9/00013 382/124 |
| 2012/0290832 A1 | 11/2012 | Antequera Rodriguez et al. | |
| 2013/0057385 A1* | 3/2013 | Murakami | G06F 21/32 340/5.82 |
| 2014/0101453 A1* | 4/2014 | Senthurpandi | H04L 63/0861 713/172 |
| 2015/0278498 A1* | 10/2015 | Hong | G06F 21/32 340/5.82 |
| 2018/0165433 A1* | 6/2018 | Morita | G06F 13/00 |

FOREIGN PATENT DOCUMENTS

| | | |
|---|---|---|
| KR | 10-2006-0001644 | 1/2006 |
| KR | 10-2006-0120148 | 11/2006 |
| KR | 10-2008-0075956 | 8/2008 |
| KR | 10-2014-0037071 | 3/2014 |
| KR | 10-2015-0118852 | 10/2015 |

OTHER PUBLICATIONS

Extended European Search Report dated Jul. 19, 2018 for EP Application No. 16879222.4.
Ratha et al., "Generating Cancelable Fingerprint Templates" IEEE Transactions on Pattern Analysis and Machine Intelligence, vol. 29, No. 4, Apr. 2007.

* cited by examiner

ELECTRONIC DEVICE FOR PROCESSING BIOMETRIC INFORMATION AND METHOD OF CONTROLLING SAME

CROSS-REFERENCE TO RELATED APPLICATION

This application is based on and claims priority under 35 U.S.C. § 119 to Korean Application Serial No. 10-2015-0186804, which was filed in the Korean Intellectual Property Office on Dec. 24, 2015, the contents of which is incorporated by reference herein in its entirety.

TECHNICAL FIELD

The present disclosure relates generally to an electronic device for processing biometric information and a method of controlling the same and, for example, to an electronic device for processing various pieces of biometric information for user recognition and a method of controlling the same.

BACKGROUND

Recently, a user recognition-related technology using a user's body characteristic such as fingerprint, iris, and the like has been developed. For example, a fingerprint recognition technology may include an element for radiating a light to the surface of the user's finger and acquiring an image of the fingerprint from a light reflected from the surface of the finger. The conventional fingerprint recognition technology includes an element for comparing the acquired image of the fingerprint and a conventionally registered image of the fingerprint and identifying the user based on a result of the comparison. The fingerprint recognition technology may be useful in that every person has different fingerprints. People may have individually different body characteristics and for example, everyone's fingerprint shapes, iris shapes, shapes of vein near the wrist are different. The conventional fingerprint recognition technology may sense the corresponding body characteristic and compare the sensed body characteristic and a pre-registered body characteristic, so as to recognize the user. In a viewpoint of the user, the fingerprint recognition technology may increase user convenience since the user can simply input his/her own body characteristic without passing through a separate complex authentication process.

As described above, the user's body characteristic is unique and considerable efforts may be required to prevent the user's body characteristic from being leaked. When only a password is leaked, the user can change the corresponding password into a new password, but cannot change the user's body characteristic. Such a problem may become serious when the conventional sensor and processing device are separated from each other. The conventional sensor may sense the user's body characteristic and transmit the sensing data to the processing device. In this case, when the sensing data is leaked, the user's body characteristic is also leaked, so the conventional biometric information recognition system has a vulnerability in terms of security.

SUMMARY

The present disclosure has been made to address the above described problem and other problems, and an electronic device and a method of controlling the same according to various example embodiments of the present disclosure may authenticate the user based on virtual biometric information.

In accordance with an example aspect of the present disclosure, an electronic device is provided. The electronic device includes: a biometric sensor; a communication module comprising communication circuitry; a processor electrically connected to the biometric sensor and the communication module; and a memory electrically connected to the processor, wherein the memory stores instructions that, when executed by the processor, cause the processor to perform operations comprising: acquiring biometric information of a user through the biometric sensor, determining virtual biometric information corresponding to the acquired biometric information, and transmitting the virtual biometric information to an external electronic device through the communication circuitry.

In accordance with another example aspect of the present disclosure, a method of controlling an electronic device is provided. The method includes: acquiring biometric information of a user; determining virtual biometric information corresponding to the acquired biometric information; and transmitting the virtual biometric information to an external electronic device.

In accordance with another example aspect of the present disclosure, an electronic device is provided. The electronic device includes: a biometric sensor; a communication module comprising communication circuitry; and a processor functionally connected to the biometric sensor and the communication module, wherein the processor is configured to acquire biometric information through the biometric sensor, to authenticate a user at least based on the biometric information, to determine virtual biometric information to be used for authenticating the user by at least one external electronic device at least based on a determination that the user is successfully authenticated, and to transmit the virtual biometric information to the at least one external electronic device through the communication circuitry.

Various example embodiments of the present disclosure may provide an electronic device and a method of providing the same capable of authenticating the user based on virtual biometric information. Accordingly, even though the virtual biometric information is leaked, the user's body characteristic can be protected and security can be enhanced.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

DETAILED DESCRIPTION

Figure 1:
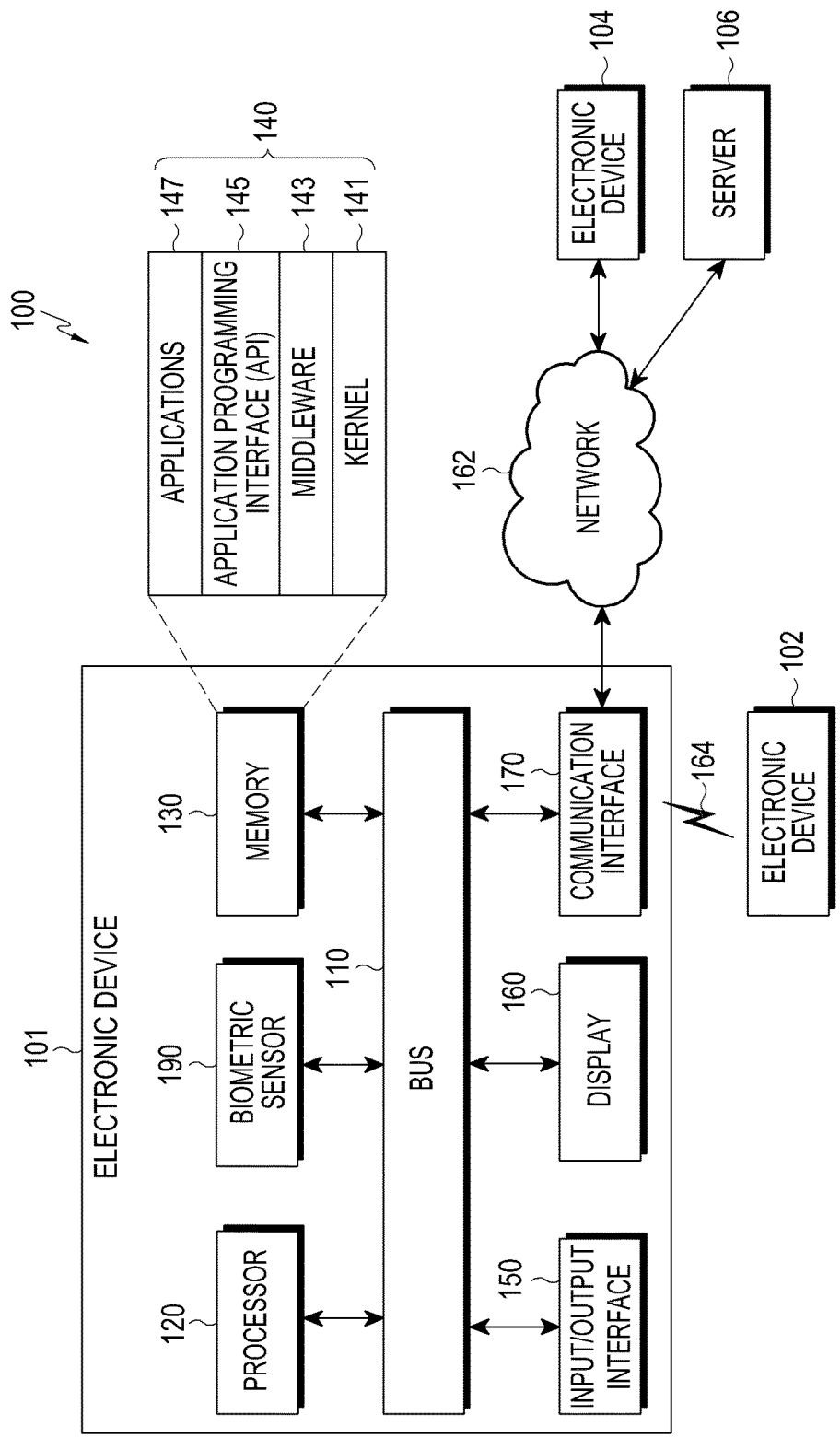
FIG. 1 is a block diagram illustrating an example electronic device and a network according to various example embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of the example embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various example embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. On the other hand, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer, for example, to a situation in which the device, together with other devices or components, "is able to". For example, the phrase "processor adapted (or configured) to perform A, B, and C" may refer, for example, to various processing circuitry, such as, for example, and without limitation, a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing various example embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even if the term is defined in the present disclosure it should not be interpreted to exclude embodiments of the present disclosure.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various example embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto. In addition, the electronic device may wirelessly receive power from a wireless power transmitter and thus may be called wireless power receiver.

According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. In various example embodiments, the electronic device may be a combination of one or more of the aforementioned various devices. According to some example embodiments, the electronic device may also be a flexible device. Further, the electronic device according to an example embodiment of the present disclosure is not limited to the aforementioned devices, and may include a new electronic device according to the development of technology.

Hereinafter, an electronic device according to various example embodiments will be described with reference to the accompanying drawings. In the present disclosure, the term "user" may indicate a person using an electronic device or a device (e.g., an artificial intelligence electronic device) using an electronic device.

Referring to FIG. 1, an electronic device 101 within a network environment 100 according to various example embodiments will be described. The electronic device 101 may include a bus 110, a processor (e.g., including processing circuitry) 120, a memory 130, an input/output interface (e.g., including input/output circuitry) 150, a display 160, a communication module (e.g., including communication circuitry) 170 and a biometric sensor 190. In some example embodiments, the electronic device 101 may omit at least one of the elements, or may further include other elements.

The bus 110 may include, for example, a circuit that interconnects the components 110 to 170 and delivers communication (for example, a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an example embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (for example, the bus 110, the processor 120, the memory 130, and the like) of the electronic device 101 to one or more of the application programs 147. For example, the middleware 143 may perform scheduling or load balancing on the one or more task requests by processing the one or more task requests according to the priorities assigned to the one or more application programs.

The API 145, which is an interface through which the applications 147 control functions provided from the kernel 141 or the middleware 143, may include, for example, at least one interface or function (for example, an instruction) for file control, window control, image processing, text control, and the like.

The input/output interface 150, for example, may include various input/output circuitry configured to function as an interface that may forward instructions or data, which is input from a user or another external device, to the other element(s) of the electronic device 101. Furthermore, the input/output interface 150 may output instructions or data, which are received from the other element(s) of the electronic device 101, to the user or the external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display, or the like, but is not limited thereto. The display 160 may display, for example, various types of contents (for example, text, images, videos, icons, symbols, and the like) for a user. The display 160 may include a touch screen and may receive, for example, a touch, gesture, proximity, or hovering input using an electronic pen or the user's body part.

The communication interface 170 may include various communication circuitry that configures communication, for example, between the electronic device 101 and an external device (for example, a first external electronic device 102, a second external electronic device 104, or a server 106). For example, the communication circuit 170 may be connected to a network 162 through wireless or wired communication to communicate with the external device (for example, the second external electronic device 104 or the server 106).

The biometric sensor 190 may sense various biometric characteristics and transfer biometric information of the sensed biometric characteristics to the processor 120.

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UNITS), WiBro (Wireless Broadband), Global System for Mobile Communications (GSM), and the like, as a cellular communication protocol. In addition, the wireless communication may include, for example, short range communication 164. The short range communication 164 may include, for example, at least one of Wi-Fi, Bluetooth, Near Field Communication (NFC), Global Navigation Satellite System (GNSS), and the like. The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include at least one of a communication network such as a computer network (for example, a LAN or a WAN), the Internet, and a telephone network.

Each of the first and second external electronic devices 102 and 104 may be of a type identical to or different from that of the electronic device 101. According to an example embodiment, the server 106 may include a group of one or more servers. According to various example embodiments, all or some of the operations executed in the electronic device 101 may be executed in another electronic device or a plurality of electronic devices (for example, the electronic devices 102 and 104 or the server 106). According to an example embodiment, when the electronic device 101 has to perform some functions or services automatically or in response to a request, the electronic device 101 may request another device (for example, the electronic device 102 or 104 or the server 106) to perform at least some functions relating thereto instead of, or in addition to, performing the functions or services by itself. The other electronic device (for example, the electronic device 102 or 104 or the server 106) may perform the requested functions or the additional functions and may transfer the execution result to the electronic device 101. The electronic device 101 may provide the received result as it is, or may additionally process the received result to provide the requested functions or services. To this end, for example, cloud computing, distributed computing, or client-server computing technology may be used.

According to various example embodiments of the present disclosure, the memory 130 may store instructions that, when executed by the processor 120, cause the processor 120 to acquire biometric information of a user through the biometric sensor 190, to determine virtual biometric information corresponding to the acquired biometric information, and to transmit the virtual biometric information to an external electronic device through the communication module 170.

According to various example embodiments of the present disclosure, the memory 130 may store instructions that, when executed by the processor 120, cause the processor 120 to acquire other biometric information to be registered in at least one of the external electronic device and the electronic device, to generate virtual biometric information corresponding to the other biometric information, and to share the generated virtual biometric information with the external electronic device through the communication module 170 before a user authentication.

According to various example embodiments of the present disclosure, the memory 130 may store instructions that, when executed by the processor 120, cause the processor 120 to store relevant information between the other biometric information and the virtual biometric information according to each user.

According to various example embodiments of the present disclosure, the memory 130 may store instructions that, when executed by the processor 120, cause the processor 120 to compare the acquired biometric information with the relevant information and to determine the virtual biometric information corresponding to the acquired biometric information.

According to various example embodiments of the present disclosure, the memory 130 may store instructions that, when executed by the processor 120, cause the processor 120 to determine the virtual biometric information corresponding to the other biometric information as the virtual biometric information when the acquired biometric information is identical to the other biometric information.

According to various example embodiments of the present disclosure, the memory 130 may store instructions that, when executed by the processor 120, cause the processor 120 to acquire other virtual biometric information for updating the virtual biometric information, to replace the virtual biometric information with the other virtual biometric information to update the relevant information, and to transmit the other virtual biometric information to the external electronic device through the communication module 170.

According to various example embodiments of the present disclosure, the memory 130 may store instructions that, when executed by the processor 120, cause the processor 120 to transmit generated user-specific virtual biometric information to the external electronic device through the communication module 170, and the external electronic device may store the user-specific virtual biometric information received from the electronic device before the user authentication and compare the virtual biometric information with the pre-stored user-specific virtual biometric information to perform the user authentication.

According to various example embodiments of the present disclosure, the memory 130 may store instructions that, when executed by the processor 120, cause the processor 120 to transmit encryption information for encrypting the virtual biometric information to the external electronic device through the communication module 170, and to encrypt the virtual biometric information based on the encryption information and to transmit the encrypted virtual biometric information to the external electronic device through the communication module 170.

According to various example embodiments of the present disclosure, the memory 130 may store instructions that, when executed by the processor 120, cause the processor 120 to encrypt the virtual biometric information and additional information based on the encryption information and to transmit the encrypted virtual biometric information and additional information to the external electronic device through the communication module 170.

According to various example embodiments of the present disclosure, the memory 130 may store instructions that, when executed by the processor 120, cause the processor 120 to provide a plurality of pieces of data for generating the virtual biometric information and to generate the virtual biometric information based on at least one selected from the plurality of pieces of data.

According to various example embodiments of the present disclosure, the processor 120 may acquire biometric information of a user, authenticate a user at least based on the biometric information, determine virtual biometric information to be used for authenticating the user by at least one external electronic device at least based on a determination that the user is successfully authenticated, and transmits the virtual biometric information to the at least one external electronic device through the communication module 170.

According to various example embodiments of the present disclosure, the processor 120 may select an external device having no sensor for acquiring the biometric information or an inactive external device among one or more external electronic devices, which can make a communication connection through the communication module 170, as the at least one external electronic device.

According to various example embodiments of the present disclosure, the processor 120 may receive a request for the virtual biometric information from the external electronic device through the communication module 170 and transmit the virtual biometric information to the external electronic device having transmitted the request through the communication module 170.

According to various example embodiments of the present disclosure, the processor 120 may generate the virtual biometric information based on the biometric information and identification information of the electronic device before the user is authenticated.

Figure 2:
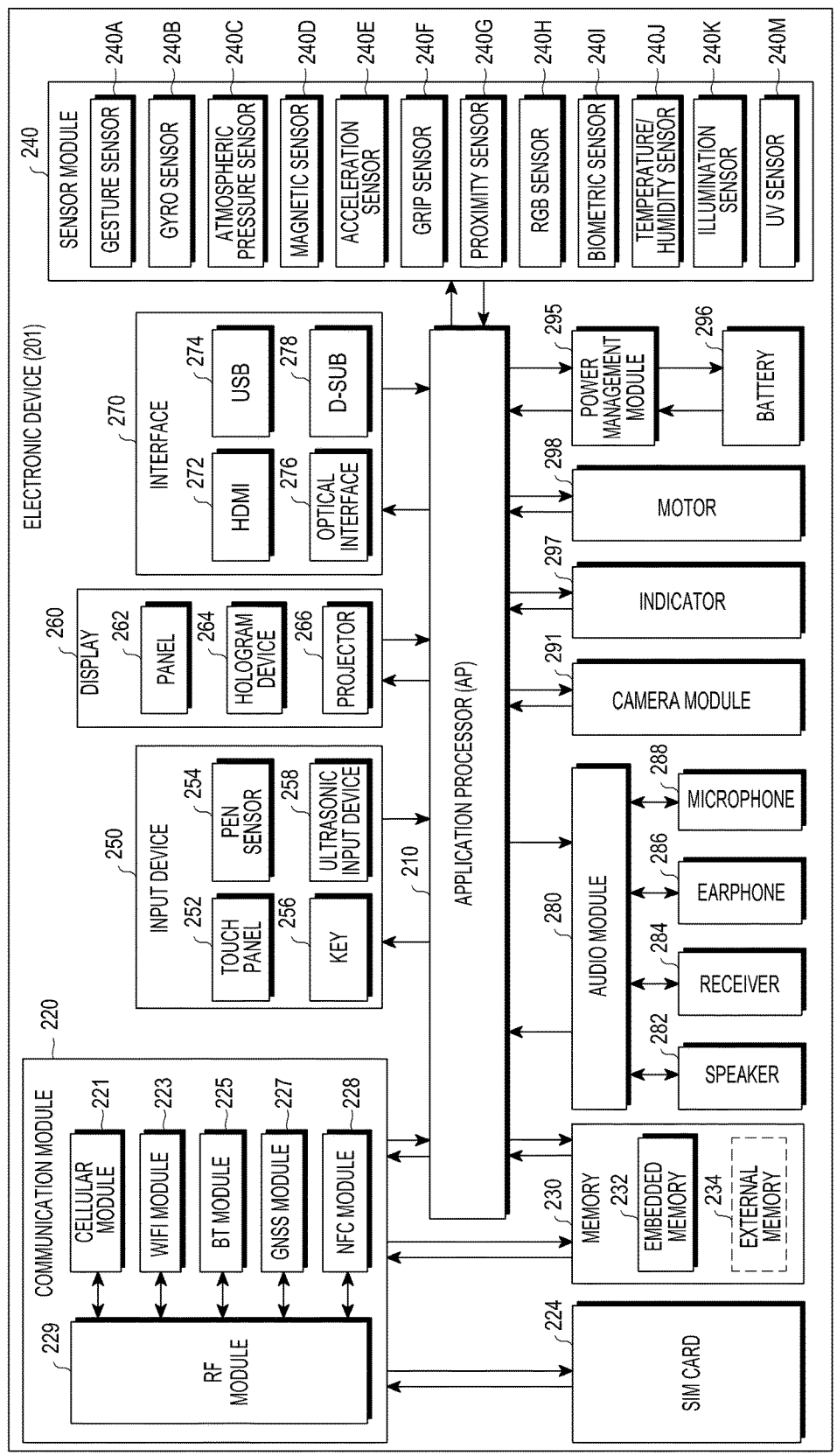
FIG. 2 is a block diagram illustrating an example electronic device according to various example embodiments.

FIG. 2 is a block diagram illustrating an example electronic device 201 according to various embodiments. The electronic device 201 may include, for example, the whole or part of the electronic device 101 illustrated in FIG. 1.

The electronic device 201 may include at least one Application Processor (AP) (e.g., including processing circuitry) 210, a communication module (e.g., including communication circuitry) 220, a Subscriber Identification Module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry configured to control a plurality of hardware or software elements connected thereto and may perform various data processing and operations by driving an operating system or an application program. The processor 210 may be embodied, for example, as a System on Chip (SoC). According to an example embodiment, the processor 210 may further include a Graphic Processing Unit (GPU) and/or an image signal processor. The processor 210 may also include at least some (for example, a cellular module 221) of the elements illustrated in FIG. 2. The processor 210 may load, in a volatile memory, instructions or data received from at least one of the other elements (for example, a non-volatile memory) to process the loaded instructions or data, and may store various types of data in the non-volatile memory.

The communication module 220 may have a configuration equal or similar to that of the communication module 170 of FIG. 1. The communication module 220 may include various communication circuitry, such as, for example, and without limitation, one or more of a cellular module 221, a Wi-Fi module 223, a Bluetooth module 225, a GNSS module 227 (for example, a GPS module, a Glonass module, a Beidou module, or a Galileo module), an NFC module 228, and a Radio Frequency (RF) module 229.

The cellular module 221 may provide, for example, a voice call, a video call, a text message service, an Internet service, and the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a Communication Processor (CP).

The Wi-Fi module 223, the BT module 225, the GNSS module 227, or the NFC module 228 may include, for example, a processor for processing data that is transmitted and received through the corresponding module. According to some embodiments, at least some (two or more) of the cellular module 221, the Wi-Fi module 223, the Bluetooth module 225, the GNSS module 227, and the NFC module 228 may be included in one Integrated Chip (IC) or IC package.

The RF module 229, for example, may transmit/receive a communication signal (for example, an RF signal). The RF module 229 may include, for example, a transceiver, a Power Amplifier Module (PAM), a frequency filter, a Low Noise Amplifier (LNA), an antenna, and the like. According to another embodiment, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 and/or an external memory 234. The internal memory 232 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory, a NOR flash memory, and the like), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, and the like. The external memory 234 may be functionally or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (for example, a red, green, blue (RGB) sensor), a biometric sensor 240I, a temperature/humidity sensor 240J, a light (e.g., illumination) sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include various input circuitry, such as, for example, and without limitation, one or more of a touch panel 252, a (digital) pen sensor 254, a key 256, or an ultrasonic input unit 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet which is a part of the touch panel or is separated from the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264 or a projector 266. The panel 262 may include the same or a similar configuration to the display 160 illustrated in FIG. 1. The panel 262 may be implemented to be, for example, flexible, transparent, or wearable. The panel 262, together with the touch panel 252, may be implemented as one module. The hologram device 264 may show a three-dimensional image in the air by using an interference of light. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include various interface circuitry, such as, for example, and without limitation, one or more of a High-Definition Multimedia Interface (HDMI) 272, a Universal Serial Bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may convert, for example, a sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, and the like.

The camera module 291 is a device that can photograph a still image and a dynamic image. According to an embodiment, the camera module 291 may include one or more image sensors (for example, a front sensor or a rear sensor), a lens, an Image Signal Processor (ISP), or a flash (for example, an LED, a xenon lamp, and the like).

The power management module 295 may manage, for example, the power of the electronic device 201. According to an embodiment, the power management module 295 may include a Power Management Integrated Circuit (PMIC), a charger Integrated Circuit (IC), or a battery or fuel gauge. The PMIC may have a wired and/or wireless charging scheme. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may indicate a particular state (for example, a booting state, a message state, a charging state, and the like) of the electronic device 201 or a part (for example, the processor 210) thereof. The motor 298 may convert an electrical signal into a mechanical vibration and may generate a vibration, a haptic effect, and the like. Although not illustrated, the electronic device 201 may include a processing unit (for example, a GPU) for supporting mobile TV. The processing unit for supporting the mobile TV may process media data according to a standard, such as Digital Multimedia Broadcasting (DMB), Digital Video Broadcasting (DVB), MediaFlo™, and the like.

Figure 3:
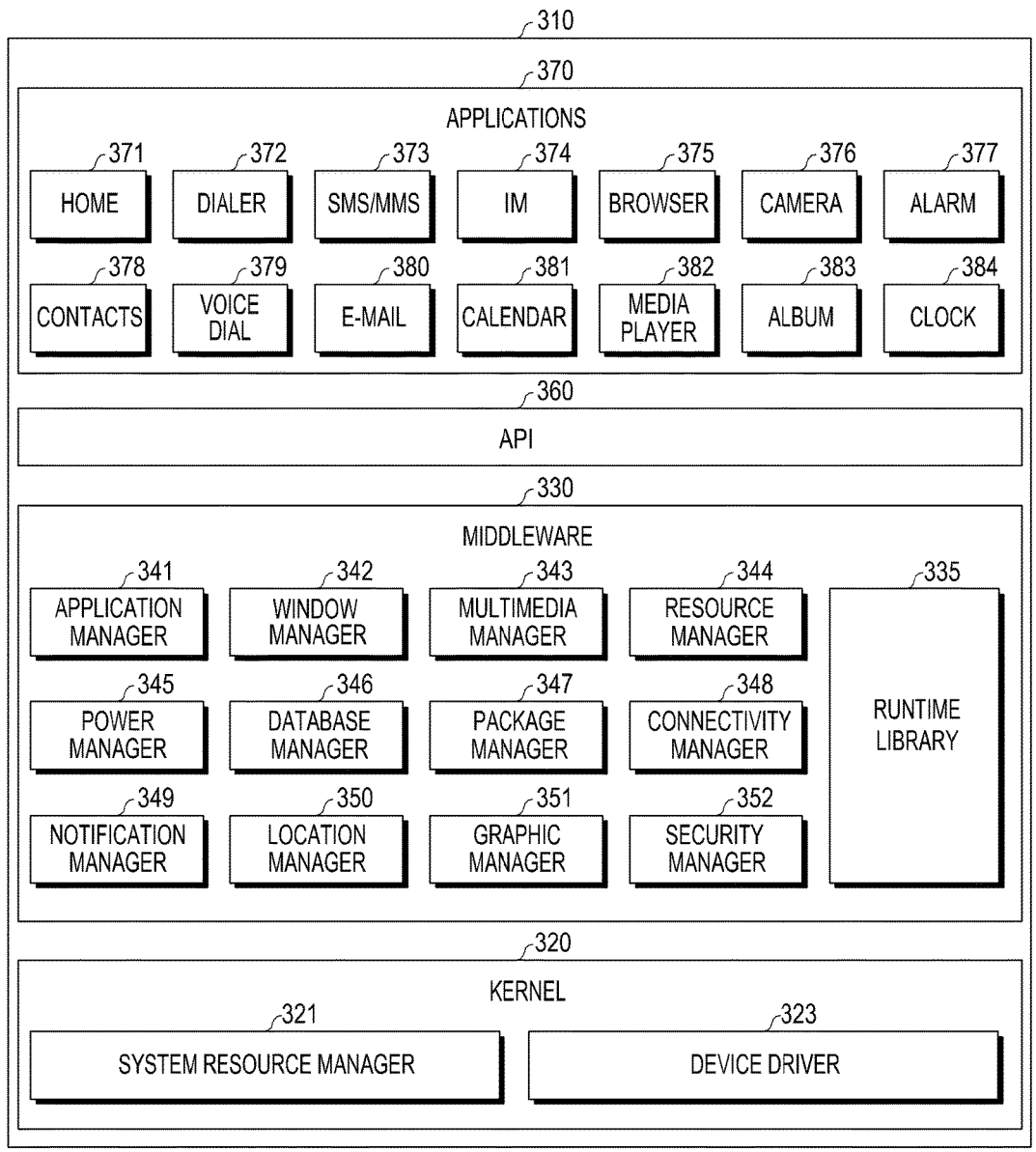
FIG. 3 is a block diagram illustrating an example program module according to various example embodiments.

FIG. 3 is a block diagram illustrating an example program module according to various example embodiments. According to an example embodiment, the program module 310 (for example, the program 140) may include an Operating System (OS) that controls resources relating to an electronic device (for example, the electronic device 101) and/or various applications (for example, the application programs 147) that are executed in the operating system. The operating system may be, for example, Android, iOS, Windows, Symbian, Tizen, Bada, and the like The program module 310 may include a kernel 320, middleware 330, an Application Programming Interface (API) 360, and/or applications 370. At least a part of the program module 310 may be preloaded on the electronic device, or may be downloaded from an external electronic device (for example, the electronic device 102 or 104 or the server 106).

The kernel 320 (for example, the kernel 141) may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 through the API 360 such that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, the functionality for an arithmetic function, and the like.

The application manager 341 may manage, for example, the life cycle of at least one of the applications 370. The window manager 342 may manage Graphical User Interface (GUI) resources used on a screen. The multimedia manager 343 may determine formats required to reproduce various media files and may encode or decode a media file using a coder/decoder (codec) appropriate for the corresponding format. The resource manager 344 may manage resources, such as the source code, the memory, the storage space, and the like of at least one of the applications 370.

The power manager 345 may operate together with, for example, a Basic Input/Output System (BIOS) to manage a battery or power and provide power information required for the operation of the electronic device. The database manager 346 may generate, search for, and/or change a database to be used by at least one of the applications 370. The package manager 347 may manage the installation or update of an application that is distributed in the form of a package file.

The connectivity manager 348 may manage a wireless connection, such as Wi-Fi, Bluetooth, and the like. The notification manager 349 may display or notify of an event, such as an arrival message, an appointment, a proximity notification, and the like, in such a manner as not to disturb a user. The location manager 350 may manage location information of the electronic device. The graphic manager 351 may manage a graphic effect to be provided to a user and a user interface relating to the graphic effect. The security manager 352 may provide various security functions required for system security, user authentication, and the like. According to an embodiment, in a case where the electronic device (for example, the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some of the existing elements, or may add new elements.

The API 360 (for example, the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 370 (for example, the application programs 147) may include one or more applications that can perform functions, for example, home 371, dialer 372, SMS/MMS 373, Instant Message (IM) 374, browser 375, camera 376, alarm 377, contacts 378, voice dial 379, e-mail 380, calendar 381, media player 382, album 383, clock 384, health care (for example, measuring exercise quantity or blood sugar), and environment information (for example, atmospheric pressure, humidity, temperature information, and the like).

According to an example embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an example embodiment, the applications 370 may include applications (for example, a health care application of a mobile medical appliance, and the like) that are specified according to attributes of an external electronic device (for example, the electronic device 102 or 104). According to an embodiment, the applications 370 may include an application received from the external electronic device (for example, the server 106, or the electronic device 102 or 104). According to an embodiment, the applications 370 may include preloaded applications or third-party applications that can be downloaded from a server. Names of the elements of the program module 310, according to the above-described embodiments of the present disclosure, may change depending on the type of OS.

According to various example embodiments of the present disclosure, at least some of the program module 310 may be implemented in software, firmware, hardware, or a combination of two or more thereof. At least some of the program module 310 may be implemented (for example, executed) by, for example, the processor (for example, the processor 210). At least some of the program module 310 may include, for example, a module, a program, a routine, a set of instructions, and/or a process for performing one or more functions.

Figure 4:
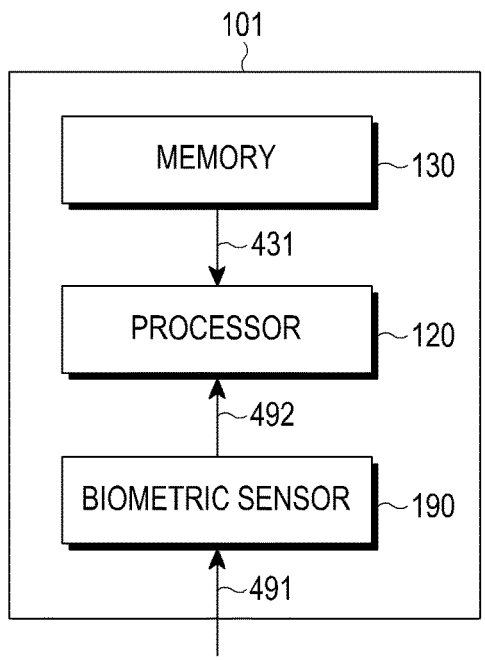
FIG. 4 is a block diagram illustrating an example electronic device according to various example embodiments of the present disclosure.

FIG. 4 is a block diagram illustrating an example electronic device according to various example embodiments of the present disclosure.

As illustrated in FIG. 4, the electronic device 101 may include, for example, the processor (e.g., including processing circuitry) 120, the memory 130, and the biometric sensor 190. The biometric sensor 190 may sense a biometric feature 491 by which the user can be recognized. For example, the biometric feature 491 may be information on different characteristics belonging to every person. For example, the biometric feature 491 may include body characteristics that are different for everyone, such as, for example, different fingerprint shapes, different iris shapes, different retina shapes, different shapes of vein near the wrist, different ear shapes, different face shapes, different hand shapes, and the like. As described above, recognition based on the uniqueness of the shapes may be named visual recognition, and there is no limitation on the biometric feature 491 if a body feature can be a target of the visual recognition. The biometric feature 491 may be physical information of various signals output from the user's body such as a voice, a brainwave, or a heartbeat waveform, and there is no limitation on the type if the signal is output from a body having an individually specific characteristic. The biometric feature 491 may include a user's behavior such as a gait habit or a typing habit. The above described recognition may be named behavior recognition, and there is no limitation if behavior information is individually distinctive. The biometric feature 491 may include information used for chemical recognition such as DNA matching or smell. As described above, the biometric feature 491 may have no limitation if information is used for recognizing a user, and the biometric sensor 190 may have no limitation if the sensor can sense various biometric features 491. For example, when biometric information for visual recognition is acquired, the biometric feature 491 may include a device for image acquisition and a device for light radiation. The biometric sensor 190 may include a microphone for sensing a voice and an electrode for measuring a brainwave or a heartbeat. The biometric sensor 190 may include a reagent control device or a chemical analysis device for acquiring biometric information used for chemical recognition.

The biometric sensor 190 may sense the biometric feature 491 and deliver biometric information 492, which is generated by converting the biometric feature 491 into an electrical signal, to the processor 120. The biometric information 492 may, for example, be raw data sensed by the biometric sensor 190 or data converted based on a specific format.

According to an embodiment, the memory 130 may store user-specific biometric information in advance. For example, the memory 130 may store user-specific biometric information as Table 1 below in advance.

TABLE 1

| User | Biometric information (fingerprint) |
| --- | --- |
| First user | First fingerprint shape |
| Second user | Second fingerprint shape |
| Third user | Third fingerprint shape |
| Fourth user | Fourth fingerprint shape |
| Fifth user | Fifth fingerprint shape |

At a time when the user is registered in an authentication system, the electronic device 101 may acquire biometric information of the fingerprint shape, map the biometric information and the user, and store the mapped biometric information and user. In Table 1, although the fingerprint shape is disclosed as the biometric information, this is only an example and the aforementioned various pieces of biometric information may be used. In addition, the electronic device 101 according to various example embodiments of the present disclosure may manage together a plurality of pieces of biometric information according to the user. For example, the electronic device 101 may store a first fingerprint shape, a first voice feature, and a first smell as biometric information of a first user, and store various pieces of biometric information such as a second fingerprint shape, a second iris shape, and a second ear shape with respect to a second user.

The processor 120 may read user-specific biometric information 431 from the memory 130 and compare the user-specific biometric information 431 with acquired biometric information 492. The processor 120 may authenticate the user based on a result of the comparison. For example, when the acquired biometric information 492 is the second fingerprint shape, it may be determined that an authentication target is the second user. According to another example embodiment, when the electronic device 101 manages various pieces of biometric information together, the processor 120 may combine results of comparison between a plurality of pieces of biometric information to authenticate the user.

According to various example embodiments of the present disclosure, the processor 120 may perform pre-processing such as removing noise from the acquired biometric information 492. The processor 120 may extract a feature from the acquired biometric information 492 and compare the extracted feature with the user-specific biometric information 431 which has been already stored based on features.

Meanwhile, according to various example embodiments of the present disclosure, the memory 130 may store user-specific virtual biometric information, and the processor 120 may authenticate the user based on the virtual biometric information. This will be described in greater detail below with reference to FIG. 6.

According to the above description, the electronic device 101 may authenticate the user based on the pre-stored biometric information or the virtual biometric information.

Figure 5A:
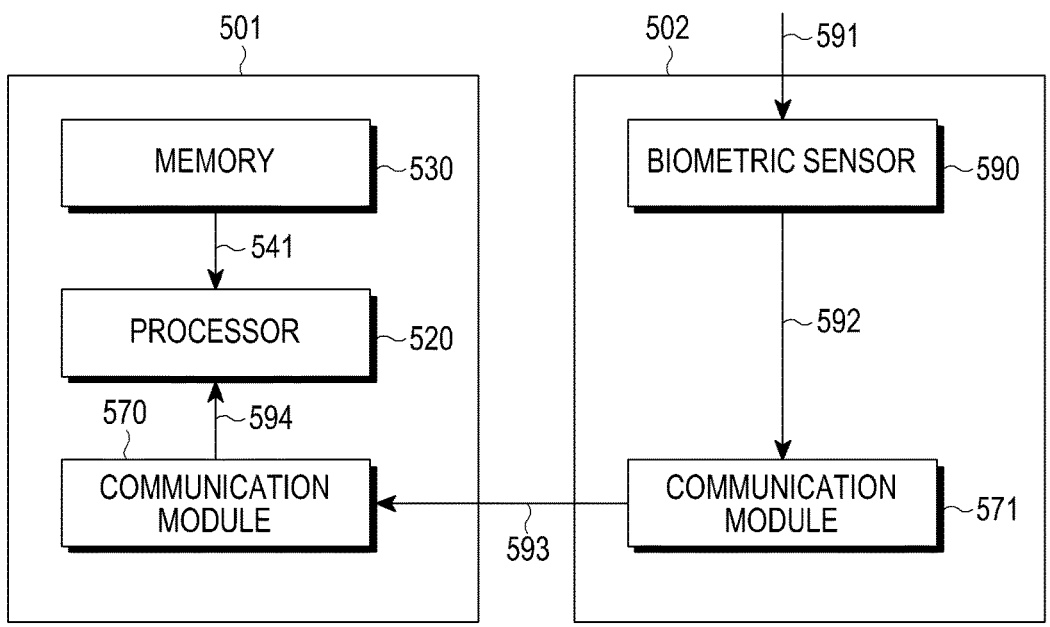
FIGS. 5A and 5B are block diagrams illustrating an example operation of an electronic device according to a comparative example for comparison with the present disclosure.
Figure 5B:
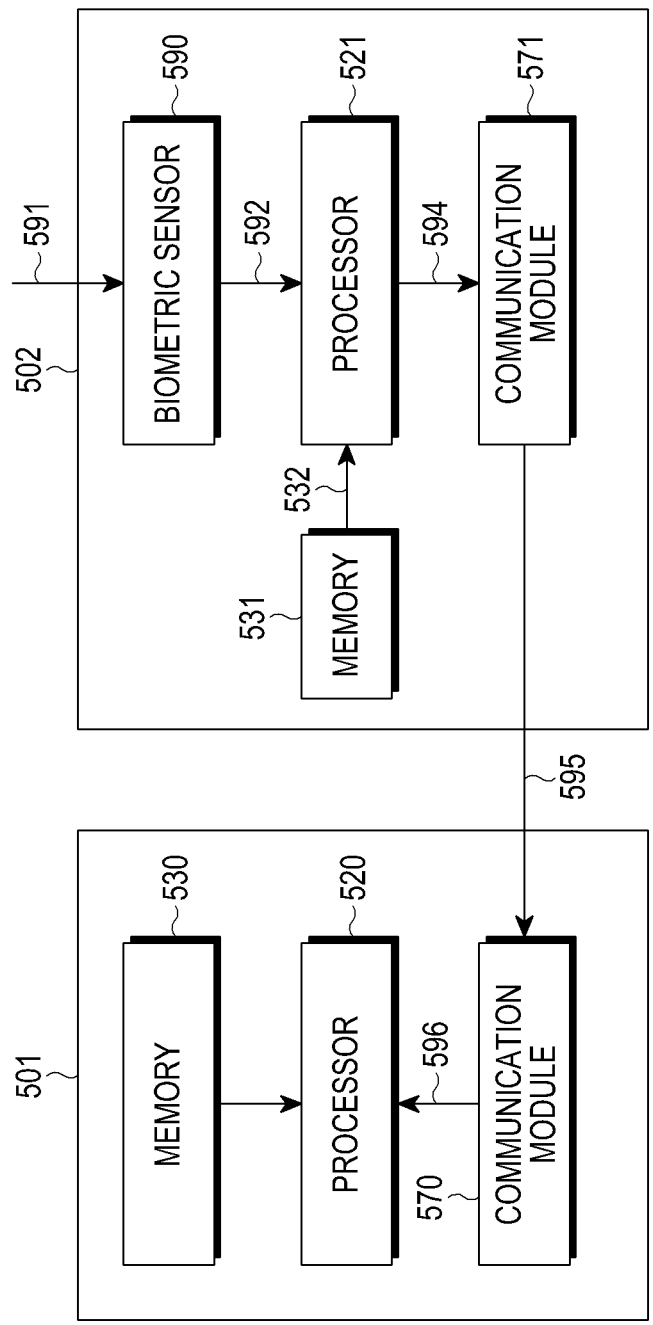

FIGS. 5A and 5B are block diagrams illustrating an example operation of an electronic device according to a comparative example for comparison with the present disclosure.

A first electronic device 501 may include, for example, a processor 520, a memory 530, and a communication module (e.g., including communication circuitry) 570. A second electronic device 502 may include, for example, a biometric sensor 590 and a communication module (e.g., including communication circuitry) 571. For example, the first electronic device 501 may be an electronic device which does not include the biometric sensor. The communication modules 570 and 571 may transmit/receive data to/from each other.

The biometric sensor 590 of the second electronic device 502 may sense a biometric feature 591 and transfer biometric information 592 to the communication module 571. The communication module 571 may transmit a signal 593 including the received biometric information 592 to the communication module 570 of the first electronic device 501.

The communication module 570 of the first electronic device 501 may process biometric information 594 from the received signal 593 and transfer the biometric information 594 to the processor 520. The processor 520 may compare user-specific biometric information 541 read from the memory 530 with the received biometric information 594 and perform an authentication based on a result of the comparison.

However, when the communication module 571 of the second electronic device 502 transmits the signal 593 including the biometric information to the communication module 570 of the first electronic device 501, the biometric information may be leaked during a signal transmission/reception process.

Referring to FIG. 5B, the second electronic device 502 according to another comparative example may include a memory 531. The second electronic device 502 may store user-specific biometric information in the memory 531 in advance, and the processor 521 may compare the read user-specific biometric information 532 with data 592 on the acquired biometric information. The processor 521 may authenticate the user based on a result of the comparison and transfer an authentication result 594 to the communication module 571. The communication module 571 may transmit a signal 595 including the authentication result, for example, information indicating that the second user has been authenticated to the communication module 570 of the first electronic device 501. The communication module 570 of the first electronic device 501 may process an authentication result 596 from the received signal 595 and transfer the authentication result 596 to the processor 520. The processor 520 may perform the authentication based on the acquired authentication result 596. According to another comparative example, there is no possibility of leakage of the biometric information during a process of transmitting and receiving the signal 595, but it is difficult to implement an integrated authentication program since different operations should be performed when an algorithm by which the first electronic device 501 authenticates the biometric information and an algorithm for processing the authentication result are stored.

Figure 6:
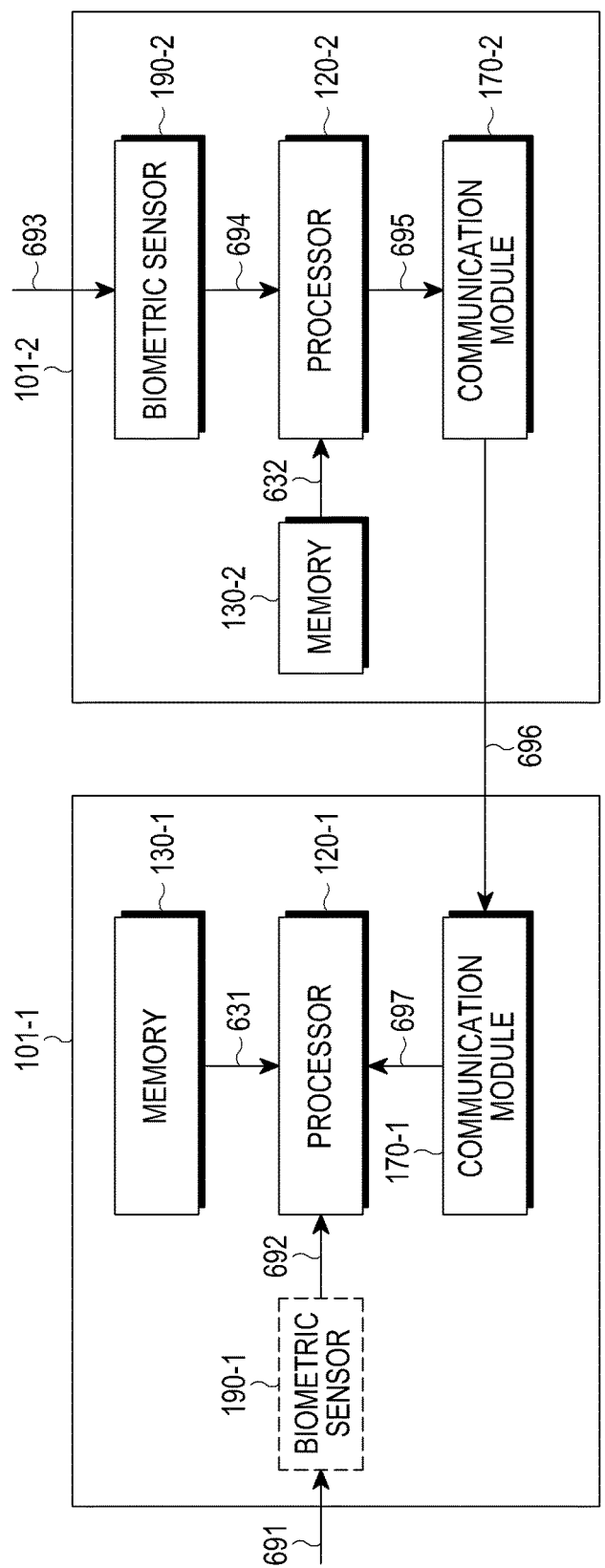
FIG. 6 is a block diagram illustrating an example operation of an electronic device according to various example embodiments of the present disclosure.

FIG. 6 is a block diagram illustrating an example operation of an electronic device according to various example embodiments of the present disclosure.

A first electronic device 101-1 may include, for example, a first processor 120-1, a first memory 130-1, a first communication module 170-1, and a first biometric sensor 190-1. According to various example embodiments of the present disclosure, the first electronic device 101-1 may include the biometric sensor 190-1 or not include the biometric sensor 190-1. A second electronic device 101-2 may include, for example, a second processor 120-2, a second memory 130-2, a second communication module 170-2, and a second biometric sensor 190-2.

The second biometric sensor 190-2 may sense a biometric feature 693. The second biometric sensor 190-2 may transfer biometric information 694 processed from the sensed biometric feature 693 to the second processor 120-2. The second memory 130-2 may store relevant information between user-specific biometric information and virtual biometric information, and may be, for example, as shown in Table 2. The relevant information may include a mapping relation between the biometric information and the virtual biometric information. For example, as shown in Table 2, the biometric information and the virtual biometric information may be mapped and stored one to one.

TABLE 2

| User | Biometric information (fingerprint) | Virtual biometric information |
|---|---|---|
| First user | First fingerprint shape | 0100011011 |
| Second user | Second fingerprint shape | 0100011100 |
| Third user | Third fingerprint shape | 0100011101 |
| Fourth user | Fourth fingerprint shape | 0100011110 |
| Fifth user | Fifth fingerprint shape | 0100011111 |

The second processor 120-2 may acquire biometric information at a time when the user is registered in the authentication system. The second processor 120-2 may generate virtual biometric information corresponding to the biometric information. For example, the second processor 120-2 may generate virtual biometric information "0100011011" based on the first fingerprint shape. The second processor 120-2 may generate virtual biometric information corresponding to the first fingerprint shape through a preset virtual biometric information generation algorithm. Meanwhile, the virtual biometric information may be required to be unique within the authentication system, and the second processor 120-2 according to various example embodiments of the present disclosure may generate virtual biometric information through a unique code generation algorithm. According to another example embodiment, the second processor 120-2 may generate virtual biometric information based on user identification information. For example, the second processor 120-2 may generate virtual biometric information based on user identification information such as a phone number corresponding to the second user, an ID, a MAC address, and an IEMI address, or the like. As the user identification information is used, uniqueness of the virtual biometric information may be guaranteed. According to various example embodiments of the present disclosure, the second electronic device 101-2 may display a user interface for selecting user identification information used as the virtual biometric information. The second electronic device 101-2 may set the user identification information selected through the user interface as the virtual biometric information. For example, the virtual biometric information may be a value that can be used instead of the biometric information and differently set according to the user. There is no limitation on the virtual biometric information if the virtual biometric information has a value different from the biometric information. According to various example embodiments of the present disclosure, the virtual biometric information may have the same format as that used in the conventional biometric information recognition algorithm. For example, when data on a fingerprint shape defined in a fingerprint recognition algorithm may use a binary number of 10 digits, the electronic device may generate and mange virtual biometric information of binary numbers of 10 digits. For example, according to various example embodiments of the present disclosure, the electronic device may generate and manage virtual biometric information having the same format as that used in the conventional biometric information recognition algorithm or generate and manage virtual biometric information having data independent from the format used in the conventional biometric information recognition algorithm.

Meanwhile, according to various example embodiments of the present disclosure, the virtual biometric information may be referred to as authentication information. For example, the electronic device may generate and manage data, for example, "0100011011" as the authentication information and use the data during a user authentication process.

Meanwhile, although Table 2 shows that a data field of the biometric information is different from a field of the virtual biometric information, this is only for convenience of the description, and the electronic devices 101-1 and 101-2 according to various example embodiments of the present disclosure may manage the biometric information and the virtual biometric information as one category without any difference. For example, the electronic devices 101-1 and 101-2 may manage the biometric information and the virtual biometric information as shown in Table 3 below.

TABLE 3

| User | Biometric information (fingerprint) |
| --- | --- |
| First user | First fingerprint shape, 0100011011 |
| Second user | Second fingerprint shape, 0100011100 |
| Third user | Third fingerprint shape, 0100011101 |
| Fourth user | Fourth fingerprint shape, 0100011110 |
| Fifth user | Fifth fingerprint shape, 0100011111 |

As the biometric information and the virtual biometric information are managed as one category, the electronic devices 101-1 and 101-2 may authenticate the user based on the virtual biometric information without significantly modifying the conventional user authentication algorithm.

At a time when the user is registered, the second electronic device 101-2 may store the relevant information between the user-specific biometric information and the virtual biometric information as shown in Table 2 or Table 3 in the second memory 130-2 and share the relevant information with another electronic device including the first electronic device 101-1. Accordingly, the first memory 130-1 of the first electronic device 101-1 may also store the relevant information of the user-specific biometric information and the virtual biometric information as shown in Table 2 or Table 3 in advance.

Meanwhile, according to various example embodiments of the present disclosure, the second electronic device 101-2 may share only the user-specific virtual biometric information with the first electronic device 101-1. For example, the second electronic device 101-2 may share user-specific virtual biometric information as shown in Table 4 below with the first electronic device 101-1.

TABLE 4

| User | Biometric information (fingerprint) |
| --- | --- |
| First user | 0100011011 |
| Second user | 0100011100 |
| Third user | 0100011101 |
| Fourth user | 0100011110 |
| Fifth user | 0100011111 |

Accordingly, the first electronic device 101-1 may store only the user-specific biometric information in the first memory 130-1 and, in this example, security for the biometric information of the user may further increase.

Meanwhile, the second processor 120-2 may authenticate the user by comparing the acquired biometric information 694 with relevant information 632 between the read user-specific biometric information and virtual biometric information. For example, the second biometric sensor 190-2 may sense the second fingerprint shape and transfer the biometric information 694 processed from the second fingerprint shape to the second processor 120-2. The second processor 120-2 may compare the acquired biometric information 694 with the relevant information 632 between the user-specific biometric information and the virtual biometric information and determine that the authenticated user is the second user and the corresponding virtual biometric information is "0100011100".

The second processor 120-2 may transfer virtual biometric information 695 corresponding to the acquired biometric information to the second communication module 170-2. The second communication module 170-2 may transmit a signal 696 including the received virtual biometric information 695 to the first communication module 170-1 of the first electronic device 101-1. The communication modules 170-1 and 170-2 may communicate based on various communication schemes. For example, even though the signal 696 is exposed (e.g., in the clear), security for the user's biometric information may increase since the virtual biometric information is exposed instead of the user's actual biometric information.

The first communication module 170-1 may process virtual biometric information 697 from the received signal 696 and transfer the virtual biometric information 697 to the first processor 120-1. The first processor 120-1 may authenticate the user by comparing, for example, the relevant information 631 between the user-specific biometric information and the virtual biometric information as shown in Table 2 or Table 3, which are read from the first memory 130, with the received virtual biometric information 697. The first processor 120-1 may authenticate the user by comparing, for example, the user-specific virtual biometric information read from the first memory 130 with the received virtual biometric information 697. For example, when the acquired virtual biometric information 697 is "0100011100", the first processor 120-1 may determine that a target to be authenticated is the second user. Accordingly, the first electronic device 101-1 and the second electronic device 101-2 may authenticate the user of which biometric information is not exposed.

In addition, when the first electronic device 101-1 includes the first biometric sensor 190-1, the first biometric sensor 190-1 may directly sense a biometric feature 691. For example, the first biometric sensor 190-1 may transfer biometric information 692 processed from the biometric feature 691 to the first processor 120-1. The first processor 120-1 may authenticate the user by comparing, for example, the relevant information 631 between the read user-specific biometric information and virtual biometric information as shown in Table 2 or Table 3 with the acquired biometric information 692. For example, when the acquired biometric information 692 corresponds to the "second fingerprint shape", the first processor 120-1 may determine that a target to be authenticated is the second user. Accordingly, the first electronic device 101-1 and the second electronic device 101-2 may authenticate the user based on at least one piece of the virtual biometric information and the biometric information.

According to the above description, when it is required to transmit biometric information from one electronic device to another electronic device, virtual biometric information is transmitted instead of the biometric information, so that the biometric information can be protected.

Figure 7:
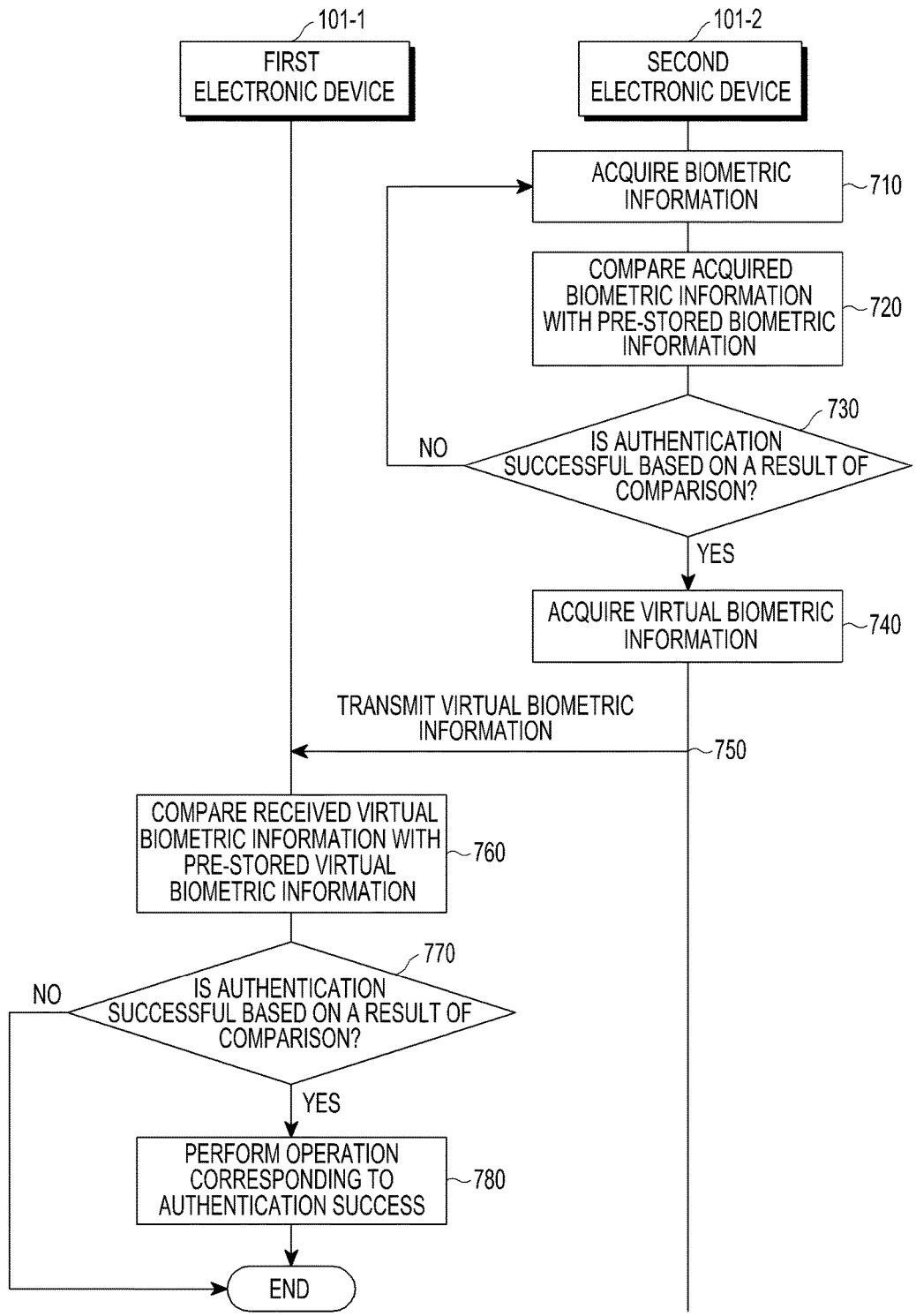
FIG. 7 is a flowchart illustrating an example method of controlling an electronic device according to various example embodiments of the present disclosure.

FIG. 7 is a flowchart illustrating an example method of controlling the electronic device according to various example embodiments of the present disclosure. According to the example embodiment of FIG. 7, the first electronic device 101-1 may be a host device that authenticates the user, and the second electronic device 101-2 may be a client device that senses biometric information. The host device may refer to an electronic device that authenticates the user based on data from the client device. The client device may refer to a device that transfers the data to the host device.

In operation 710, the second electronic device 101-2 may sense a biometric feature and acquire biometric information. In operation 720, the second electronic device 101-2 may compare the acquired biometric information with pre-stored biometric information. For example, the second electronic device 101-2 may store relevant information between the user-specific biometric information and the virtual biometric information as shown in Table 2 or Table 3 in advance. The second electronic device 101-2 may identify whether there is stored biometric information that is mapped to the sensed biometric information.

In operation 730, the second electronic device 101-2 may determine whether the user is successfully authenticated based on a result of the identification. When biometric information, which is the same as the sensed biometric information, is included in the pre-stored information, the second electronic device 101-2 may determine that the authentication has succeeded. For example, the second electronic device 101-2 may sense the "second fingerprint shape". When it is identified that the sensed "second fingerprint shape" is included in the relevant information as shown in Table 2 or Table 3, the second electronic device 101-2 may determine that the user is successfully authenticated.

When the user is successfully authenticated, the second electronic device 101-2 may acquire virtual biometric information in operation 740. As described above, the relevant information which the second electronic device 101-2 stored in advance may include biometric information and virtual biometric information that are mapped to each other. The second electronic device 101-2 may acquire virtual biometric information corresponding to the sensed biometric information based on the pre-stored relevant information. For example, the second electronic device 101-2 may acquire virtual biometric information of "0100011100" corresponding to the sensed "second fingerprint shape". As described above, the virtual biometric information "0100011100" has no limitation if the virtual biometric information has a value having uniqueness within the user authentication system, and may be variously implemented as, for example, a MAC address of the second electronic device 101-2, a user ID, a phone number allocated to the user, or a simply generated dummy value.

In operation 750, the second electronic device 101-2 may transmit the virtual biometric information to the first electronic device 101-1. According to various example embodiments of the present disclosure, the second electronic device 101-2 may transmit the virtual biometric information to the first electronic device 101-1 in the form of raw data. According to another example embodiment of the present disclosure, the second electronic device 101-2 may encrypt the virtual biometric information to generate a cryptogram and transmit the generated cryptogram to the first electronic device 101-1. In this example, the second electronic device 101-2 may share a key for an encryption and a decryption with the first electronic device 101-1 in advance and encrypt the virtual biometric information by using the shared key. It may be readily understood by those skilled in the art that there is not limitation on an encryption method for encrypting the virtual biometric information and a decryption method of decrypting the cryptogram.

In operation 760, the first electronic device 101-1 may compare the received virtual biometric information with the pre-stored virtual biometric information. In operation 770, the first electronic device 101-1 may determine whether the user is successfully authenticated based on a result of the comparison. According to various example embodiments of the present disclosure, the first electronic device 101-1 may share and store in advance, for example, the relevant information between the user-specific biometric information and the virtual biometric information as shown in Table 2 or Table 3 with the second electronic device 101-2. According to another example embodiment, the first electronic device 101-1 may share and store in advance, for example, the user-specific virtual biometric information as shown in Table 4 with the second electronic device 101-2.

The first electronic device 101-1 may determine whether the user is successfully authenticated by determining whether virtual biometric information, which is the same as the received virtual biometric information, is included in the pre-stored relevant information. For example, the first electronic device 101-1 may determine that the user is successfully authenticated by identifying that virtual biometric information "0100011100" is included in the relevant information as shown in Table 2 or Table 3 or the user-specific virtual biometric information as shown in Table 4. Further, the first electronic device 101-1 may determine that a target to be authenticated is the second user.

In operation 780, the first electronic device 101-1 may perform an operation corresponding to the authentication success. For example, the first electronic device 101-1 may authenticate the user during an electronic commerce application process, and may continue or stop the electronic commerce based on a result of the user authentication. According to various example embodiments of the present disclosure, the first electronic device 101-1 may use the user authentication in various processes and there is no limitation on the operation corresponding to the user authentication.

As described above, the first electronic device 101-1 may authenticate the user based on the virtual biometric information received from the second electronic device 101-2. For example, as the virtual biometric information is received between the electronic devices 101-1 and 101-2, the user's biometric information may be protected even though the virtual biometric information is exposed in the transmission/reception process.

Figure 8A:
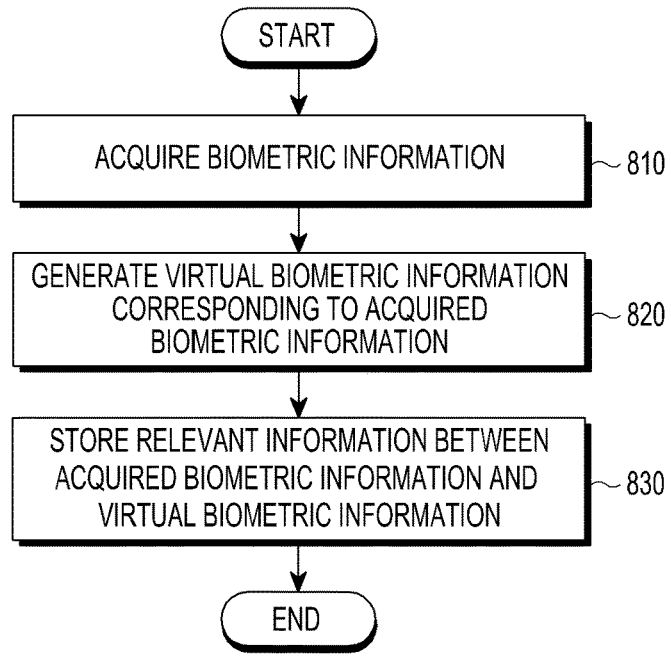
FIGS. 8A, 8B and 8C are flowcharts illustrating an example operation of an electronic device while biometric information is registered according to various example embodiments of the present disclosure.
Figure 8B:
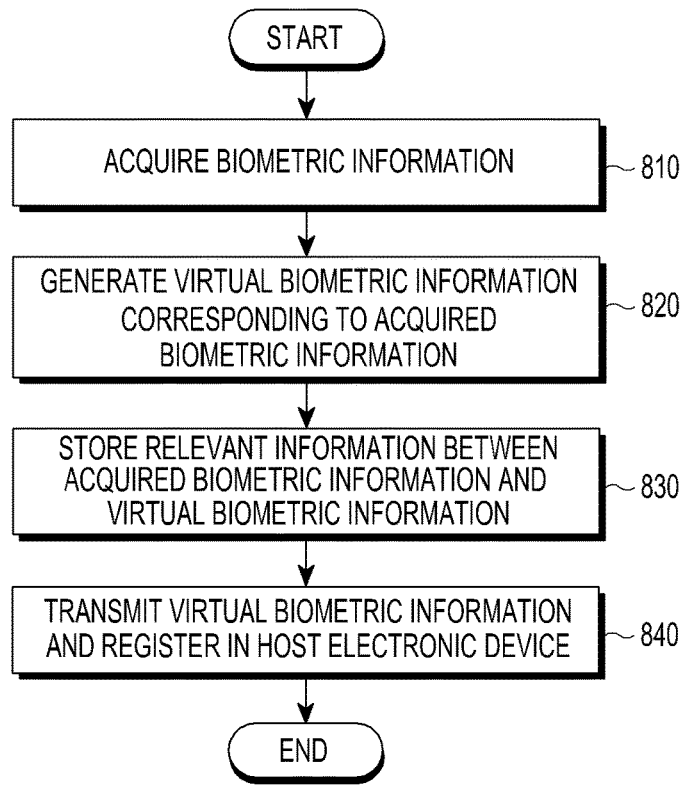
Figure 8C:
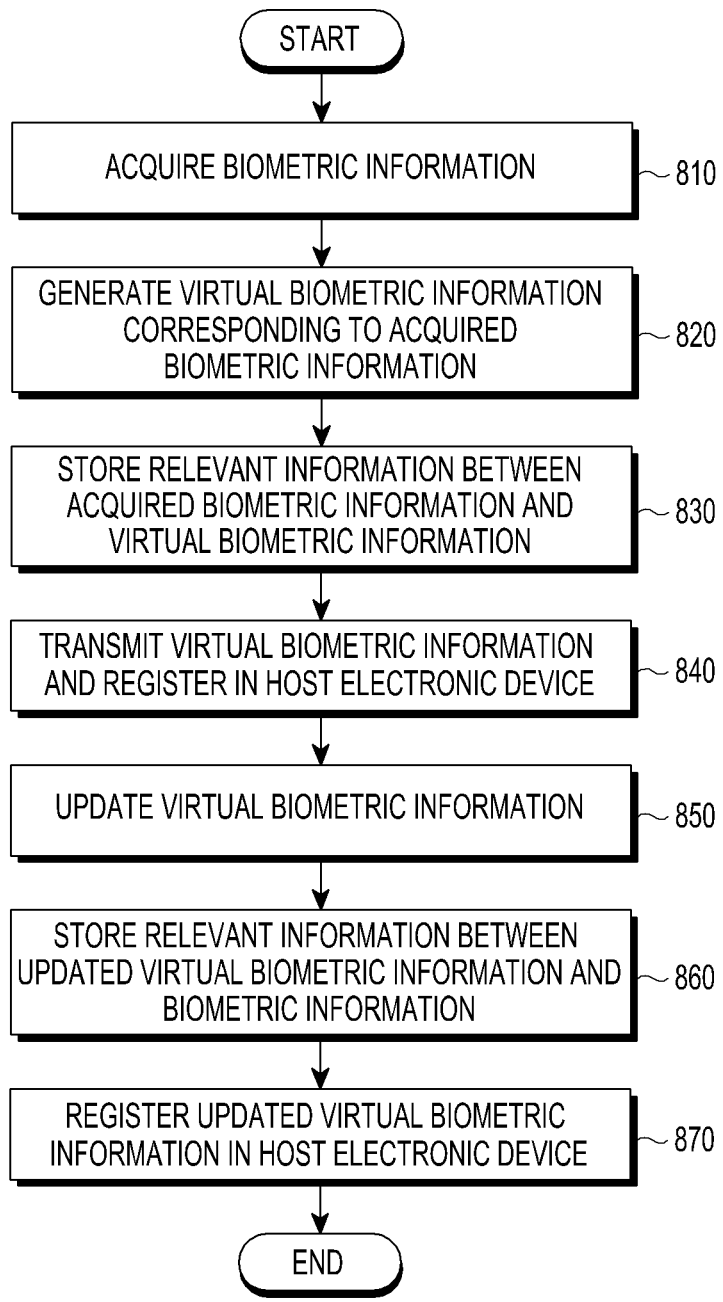

FIGS. 8A, 8B and 8C are flowcharts illustrating an example operation of the electronic device while biometric information is registered according to various example embodiments of the present disclosure.

Referring to FIG. 8A, in operation 810, the electronic device 101 may acquire biometric information to be registered. According to various example embodiments of the present disclosure, at a time when the user subscribes to the user authentication system, the electronic device 101 may display a user interface for asking the user to register a biometric feature. The user may input the biometric feature into the electronic device 101 according to the user interface, and the electronic device 101 may acquire biometric information based on the sensed biometric feature.

In operation 820, the electronic device 101 may generate virtual biometric information corresponding to the acquired biometric information. According to various example embodiments of the present disclosure, the electronic device 101 may generate virtual biometric information having a value of which uniqueness is guaranteed in the user authentication system. For example, the electronic device 101 may generate the virtual biometric information through an algorithm for determining the value of which uniqueness is guaranteed. The electronic device 101 may use user relevant information such as a user ID of which uniqueness is guaranteed or a phone number allocated to the user may be used as the virtual biometric information. The electronic device 101 may user electronic device relevant information such as a MAC address as the virtual biometric information.

In operation 830, the electronic device 101 may store relevant information between the acquired biometric information and the virtual biometric information based on the user.

According to the above description, the electronic device 101 may generate user-specific virtual biometric information and generate relevant information between the biometric information and the virtual biometric information. When another user additionally subscribes, the electronic device 101 may repeat the above described process for the subscribed user, and add and manage relevant information.

Referring to FIG. 8B, in operation 840, the electronic device 101 may transmit the generated virtual biometric information to an external device (for example, a host electronic device) to allow the external device to register the virtual biometric information and/or store the virtual biometric information in the memory. The electronic device 101 may make a request for registration. For example, the electronic device 101 may share relevant information between user-specific biometric information and virtual biometric information with another electronic device, for example, the host electronic device.

Referring to FIG. 8C, in operation 850, the electronic device 101 may update the virtual biometric information. As described above in connection with FIG. 7, the electronic device 101 may transmit and receive the virtual biometric information to and from another electronic device in the user authentication process. The virtual biometric information may be used instead of the biometric information, and thus periodic replacement thereof may be needed. Accordingly, when a periodic or user command is input, the electronic device 101 may update the user-specific biometric information to be another value. The electronic device 101 may determine updated virtual biometric information based on a user's selection or determine the updated virtual biometric information through a preset selection algorithm.

In operation 860, the electronic device 101 may store relevant information between the updated virtual biometric information and the biometric information according to the user. In operation 870, the electronic device 101 may register the updated virtual biometric information in the host electronic device and/or in the electronic device 101. For example, the electronic device 101 may share the relevant information between the user-specific biometric information and the updated virtual biometric information with another electronic device, for example, the host electronic device.

According to the above description, the security may further increase by the present disclosure compared to the conventional user authentication system using biometric information itself that cannot be updated to be another value.

Figure 9:
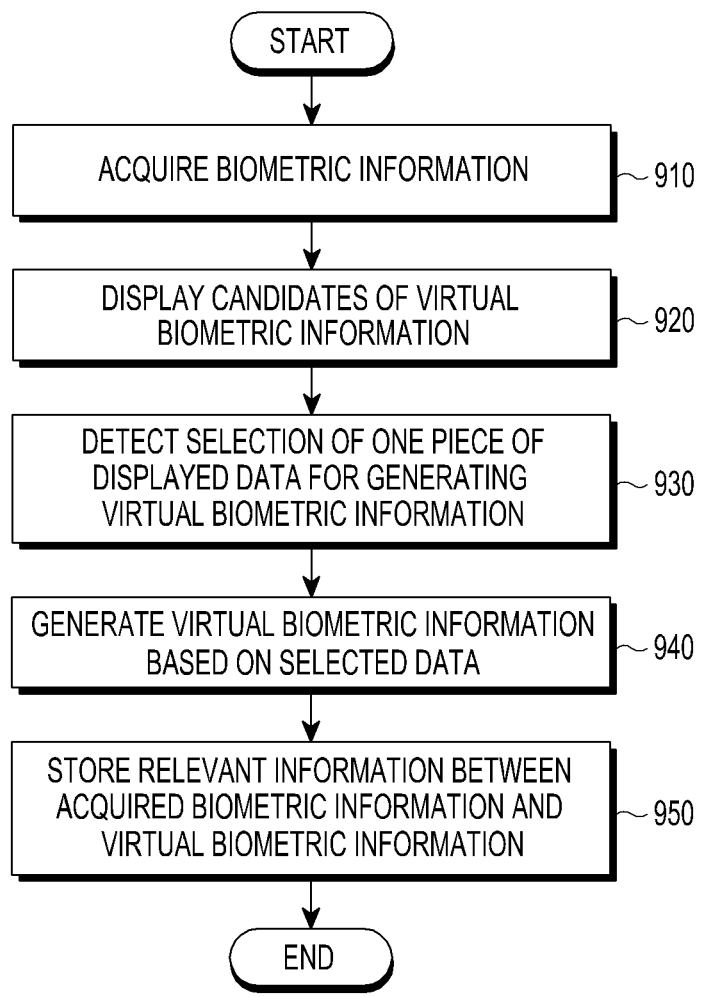
FIG. 9 is a flowchart illustrating an example process of selecting virtual biometric information according to various example embodiments of the present disclosure.
Figure 10A:
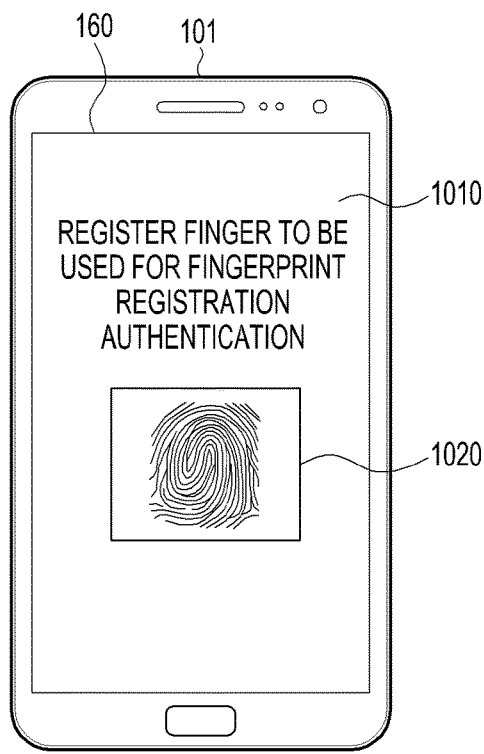
FIGS. 10A and 10B are diagrams illustrating an example operation of an electronic device according to various example embodiments of the present disclosure.
Figure 10B:
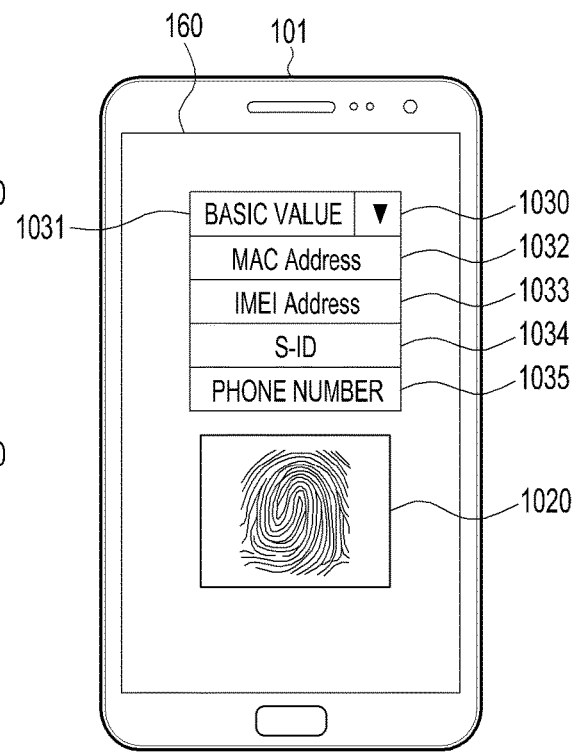

FIG. 9 is a flowchart illustrating an example process of selecting virtual biometric information according to various example embodiments of the present disclosure. The embodiment of FIG. 9 will be described in greater detail below with reference to FIGS. 10A and 10B. FIGS. 10A and 10B are diagrams illustrating an example operation of the electronic device according to various example embodiments of the present disclosure.

Referring to FIG. 9, in operation 910, the electronic device 101 may acquire biometric information by sensing a biometric feature to be registered. According to various example embodiments of the present disclosure, at a time when the user subscribes to the user authentication system, the electronic device 101 may display a user interface that asks the user to register biometric information. The user may input the biometric feature into the electronic device 101 according to the user interface, and the electronic device 101 may acquire biometric information. For example, as illustrated in FIG. 10A, the electronic device 101 may display a user interface 1010 that makes a request for inputting a biometric feature, for example, fingerprint on the display 160. The user may input the fingerprint according to the user interface 1010, and the electronic device 101 may display a shape 1020 of the input fingerprint in order to help user recognition.

In operation 920, the electronic device 101 may display candidates of virtual biometric information. For example, as illustrated in FIG. 10B, the electronic device 101 may display a selection box 1030 for selecting one piece of data on the display 160 1031 to 1035 to generate virtual biometric information. In the example embodiment of FIG. 10B, the data 1031 to 1035 for generating virtual biometric information may include various pieces of information such as, for example, and without limitation, a basic value of which uniqueness is guaranteed, a Media Access Control (MAC) address, an International Mobile Equipment Identity (IMEI) address, a user ID, and a phone number.

In operation 930, the electronic device 101 may detect a selection of one piece of the displayed data for generating the virtual biometric information. For example, the user may select the phone number 1035 in the selection box 1030, and the electronic device 101 may identify a selected target based on a touch position by the user.

In operation 940, the electronic device 101 may generate virtual biometric information using the selected data for generating the virtual biometric information. For example, when the phone number 1035 is selected in FIG. 10B, the electronic device 101 may generate virtual biometric information using the phone number. For example, the electronic device 101 may determine the phone number as the virtual biometric information or determine a value generated using the phone number as the virtual biometric information. In operation 950, the electronic device 101 may store relevant information between the acquired biometric information and the virtual biometric information. For example, the electronic device 101 may store information the relevant information as shown in Table 2 or Table 3 such that the user is linked with input fingerprint information and a phone number. The electronic device 101 may share the relevant information with another electronic device such as a host device.

Thereafter, when the user is authenticated, the electronic device 101 may ask the user to input the fingerprint and, when the input fingerprint information matches pre-stored fingerprint information, may transmit the phone number to the host device as the virtual biometric information. The host device may compare the received phone number with the pre-stored relevant information and authenticate the user based on a result of the comparison.

FIGS. 11A, 11B, 11C and 11D are diagrams illustrating an example process of registering a vein shape.

Figure 11A:
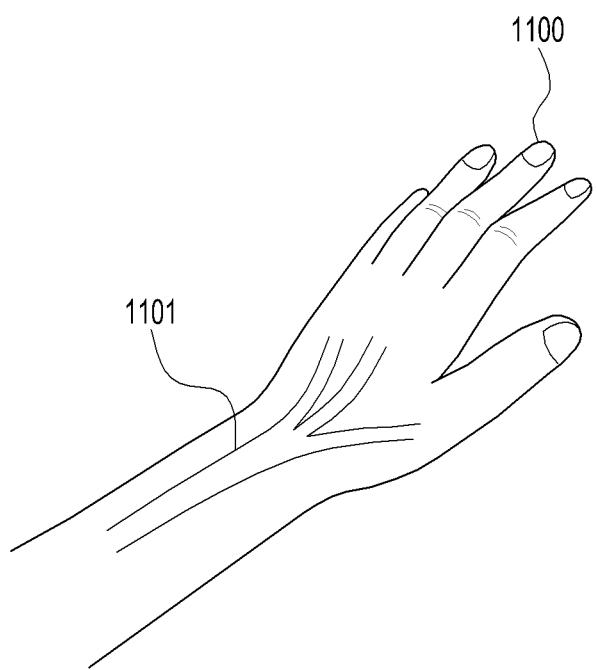
FIGS. 11A, 11B, 11C and 11D are diagrams illustrating an example process of registering a vein shape.

Referring to FIG. 11A, a vein 1101 may be located at the inner side of a wrist of a user's hand 1100. The vein 1101 corresponds to a blood vessel through which blood circulating an arterial system flows toward the heart, and the shape of the vein 1101 located at the inner side of the wrist may vary depending on each person. Since the shape varies depending on each person, the vein 1101 may be used for authenticating the user and many conventional technologies for an authentication by the shape of the vein 1101 have been developed.

Figure 11B:
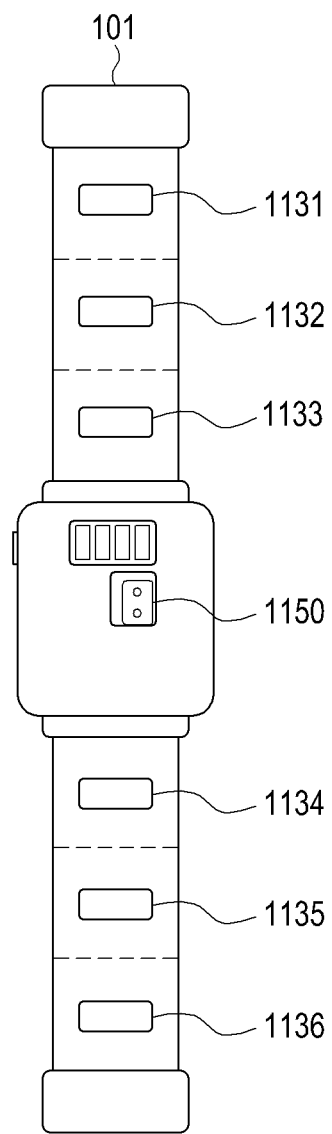

Referring to FIG. 11B, the electronic device 101 according to various example embodiments of the present disclosure may be implemented, for example, as a wrist watch type wearable electronic device. The electronic device 101 may include inward sensors 1131 to 1136 and 1150 on the back surface thereof. The inward sensors 1131 to 1136 may be implemented as, for example, a pressure sensor, an optical sensor, and an electrode, and may recognize a user's touch, an ECG signal, and a fingerprint. According to an example embodiment, the inward sensor 1150 may be implemented as an optical sensor and may include a Heart Rate Monitor (HRM) sensor, a Blood Pressure (BP) sensor, a glucose sensor, a body temperature sensor, a vein sensor, and a bio-marker sensor, or the like.

Figure 11C:
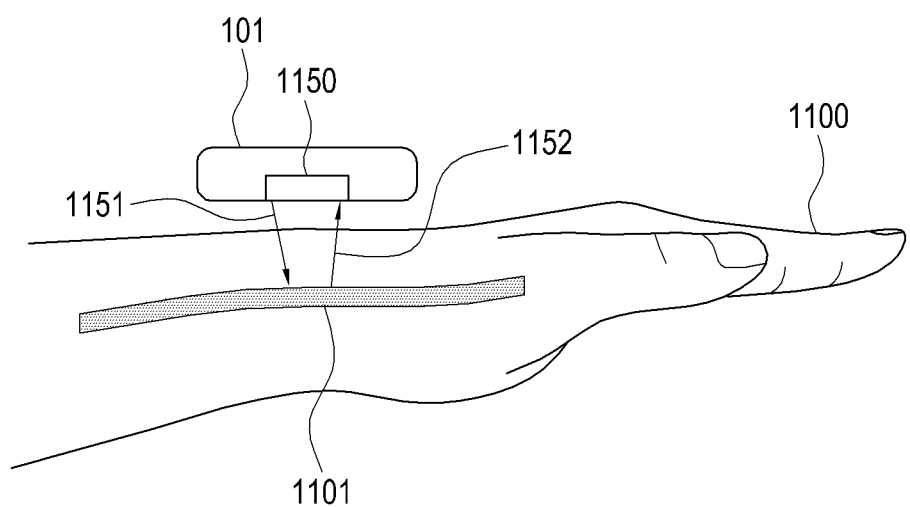

For example, as illustrated in FIG. 11C, the inward sensor 1150 may radiate a light 1151 toward the wrist of the user's hand 1100. The light 1151 may be reflected by the vein 1101, and the reflected light 1152 may be input into the inward sensor 1150. The inward sensor 1150 may recognize the shape of the vein 1101 by using the received reflected light 1152.

Figure 11D:
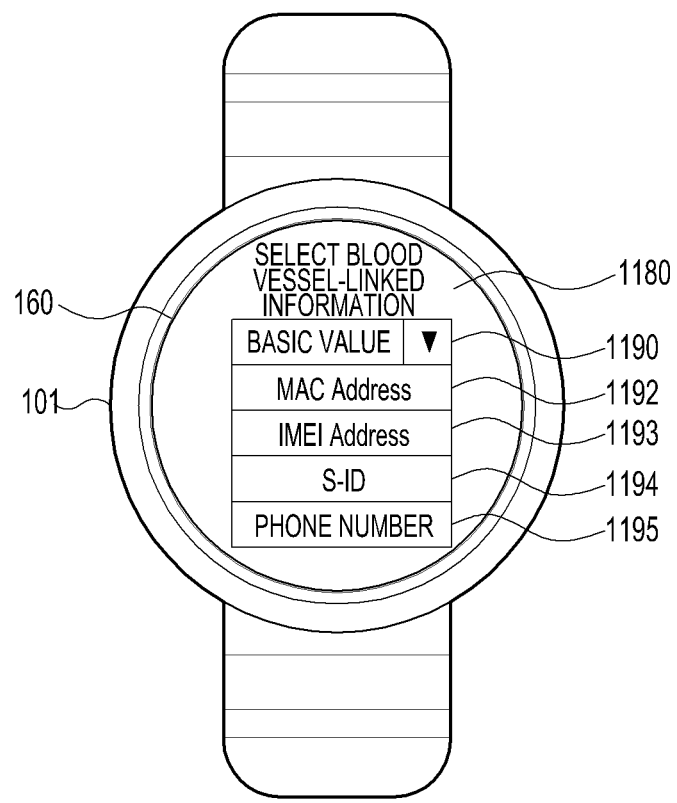

The electronic device 101 may display a selection box 1190 for selecting one piece of data 1192 to 1195 on the display 160 to generate virtual biometric information as illustrated, for example, in FIG. 11D. In an example embodiment of FIG. 11D, the data 1192 to 1195 for generating the virtual biometric information may include various pieces of information such as a basic value of which uniqueness is guaranteed, a MAC address, an IMEI address, a user ID, and a phone number, or the like. The electronic device 101 may detect a selection of one piece of the displayed data for generating the virtual biometric information. For example, the user may select the phone number 1195 in the selection box 1190, and the electronic device 101 may identify a selected target based on a touch position by the user. The electronic device 101 may determine virtual biometric information based on the selected data 1195. For example, the electronic device 101 may determine the selected data 1195 itself as the virtual biometric information or determine a value generated using the selected data 1195 as the virtual biometric information, and may store the virtual biometric information to be linked with the shape of the vein 1101. Meanwhile, according to various example embodiments of the present disclosure, the electronic device 101 may acquire virtual biometric information corresponding to the shape of the vein 1101 based on a preset virtual biometric information determination method without the user's selection.

Figure 12A:
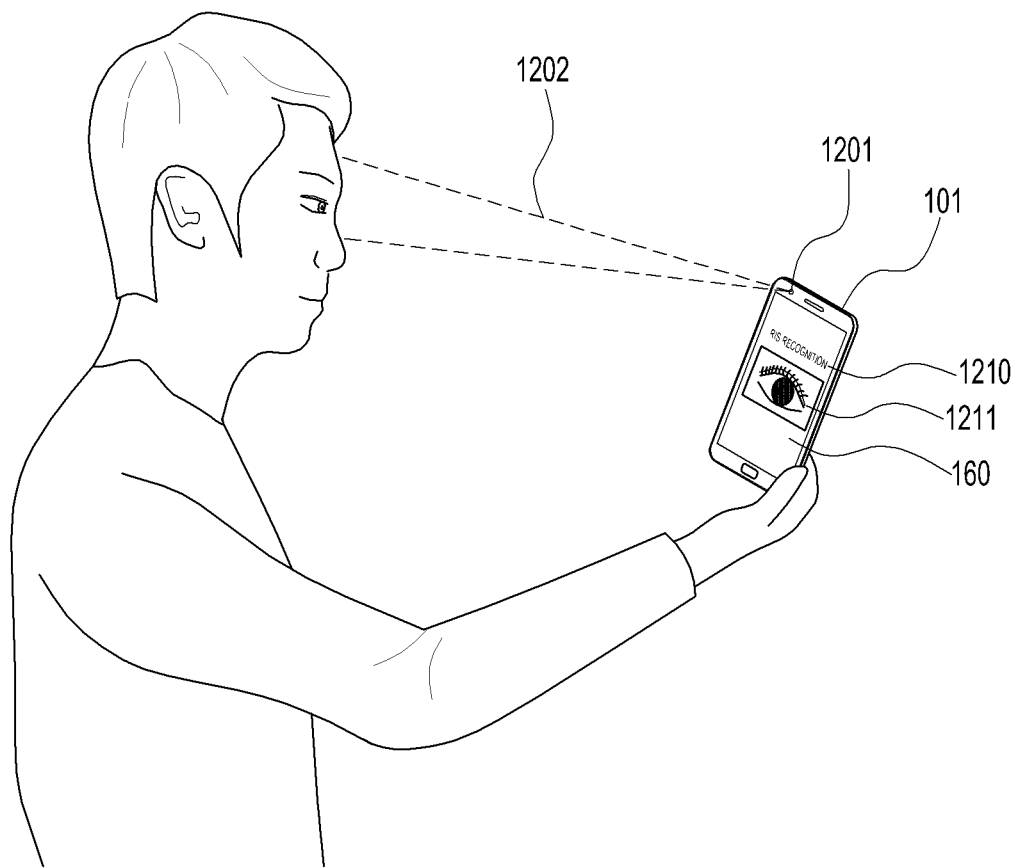
FIGS. 12A and 12B are diagrams illustrating an example iris shape registration according to various example embodiments of the present disclosure.
Figure 12B:
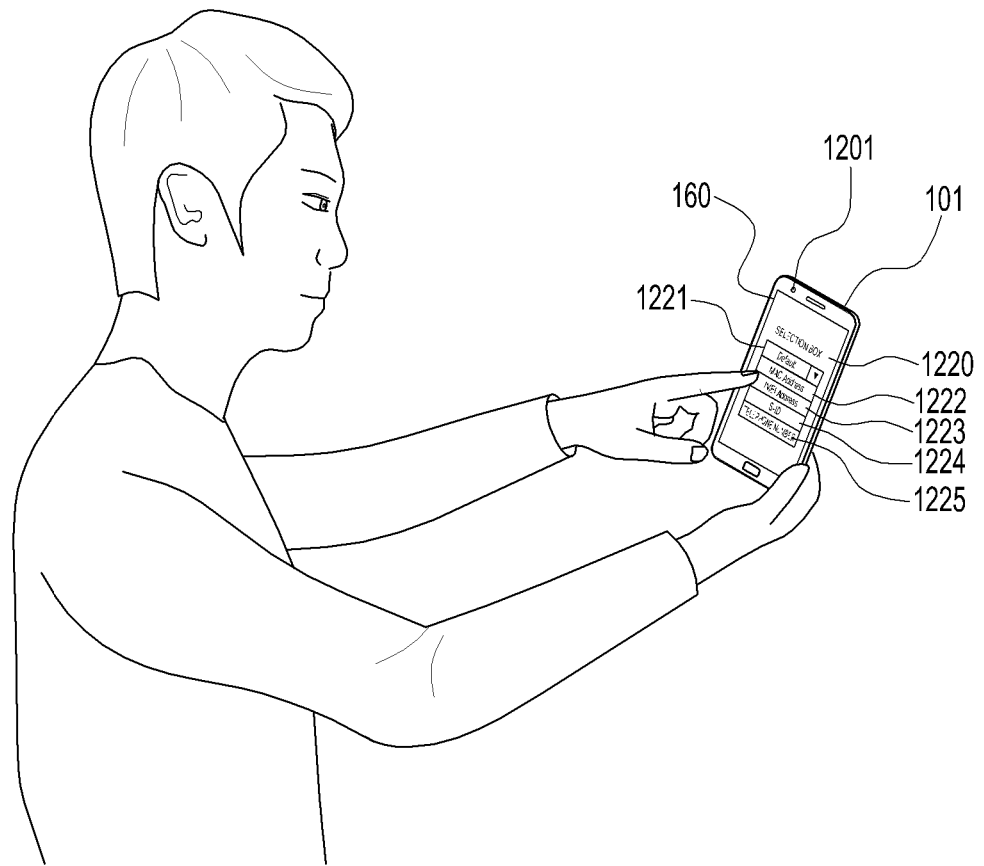

FIGS. 12A and 12B are diagrams illustrating an example iris shape registration according to various example embodiments of the present disclosure.

Referring to FIG. 12A, the electronic device 101 may display a user interface 1210 for iris recognition on the display 160. The electronic device 101 may photograph a user's face portion by using a camera 1201 as indicated by reference numeral 1202. The user interface 1210 for iris recognition according to various example embodiments of the present disclosure may include a shape of an iris 1211 photographed to help user recognition. The electronic device 101 may determine virtual biometric information corresponding to the shape of the iris.

For example, as illustrated in FIG. 12B, the electronic device 101 may display a selection box 1220 for selecting one piece of data 1221 to 1225 on the display 160 to generate virtual biometric information. In the example embodiment of FIG. 12B, the data 1221 to 1225 for generating the virtual biometric information may include various pieces of information such as a basic value of which uniqueness is guaranteed, a MAC address, an IMEI address, a user ID, and a phone number, or the like. The electronic device 101 may detect a selection of one piece of the displayed data for generating the virtual biometric information. For example, the user may select the IMEI 1223 in the selection box 1220, and the electronic device 101 may identify a selected target based on a touch position by the user. The electronic device 101 may determine virtual biometric information based on the selected data 1223. For example, the electronic device 101 may determine the selected data 1195 itself as the virtual biometric information or determine a value generated using the selected data 1195 as the virtual biometric information, and may store the virtual biometric information to be linked with the shape of the iris 1211. Meanwhile, according to various example embodiments of the present disclosure, the electronic device 101 may acquire virtual biometric information corresponding to the shape of the iris 1221 based on a preset virtual biometric information determination method without user's selection.

Figure 13:
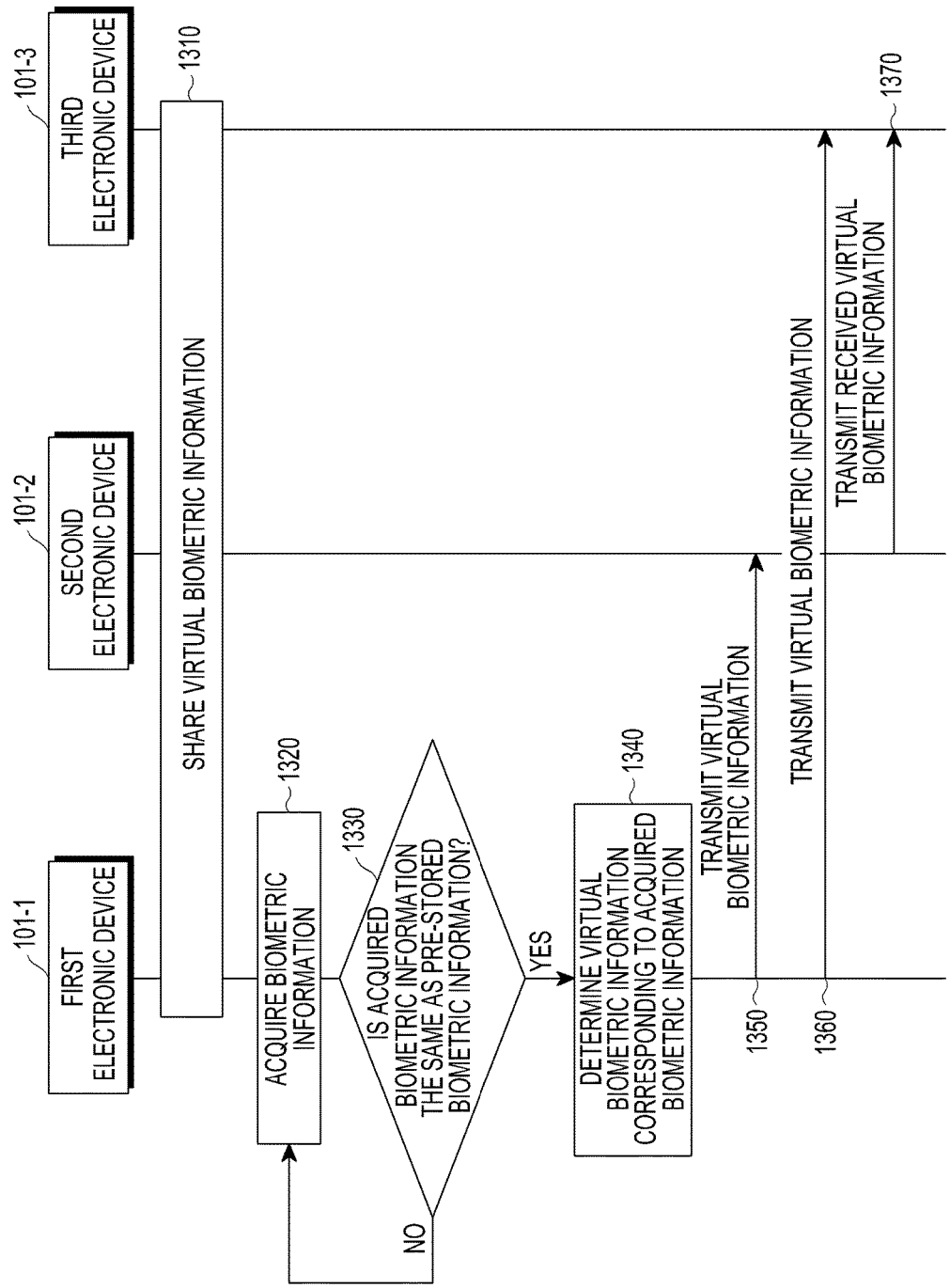
FIG. 13 is a flowchart illustrating an example method of controlling an electronic device in an Internet of Things (IoT) environment according to various example embodiments of the present disclosure.
Figure 14A:
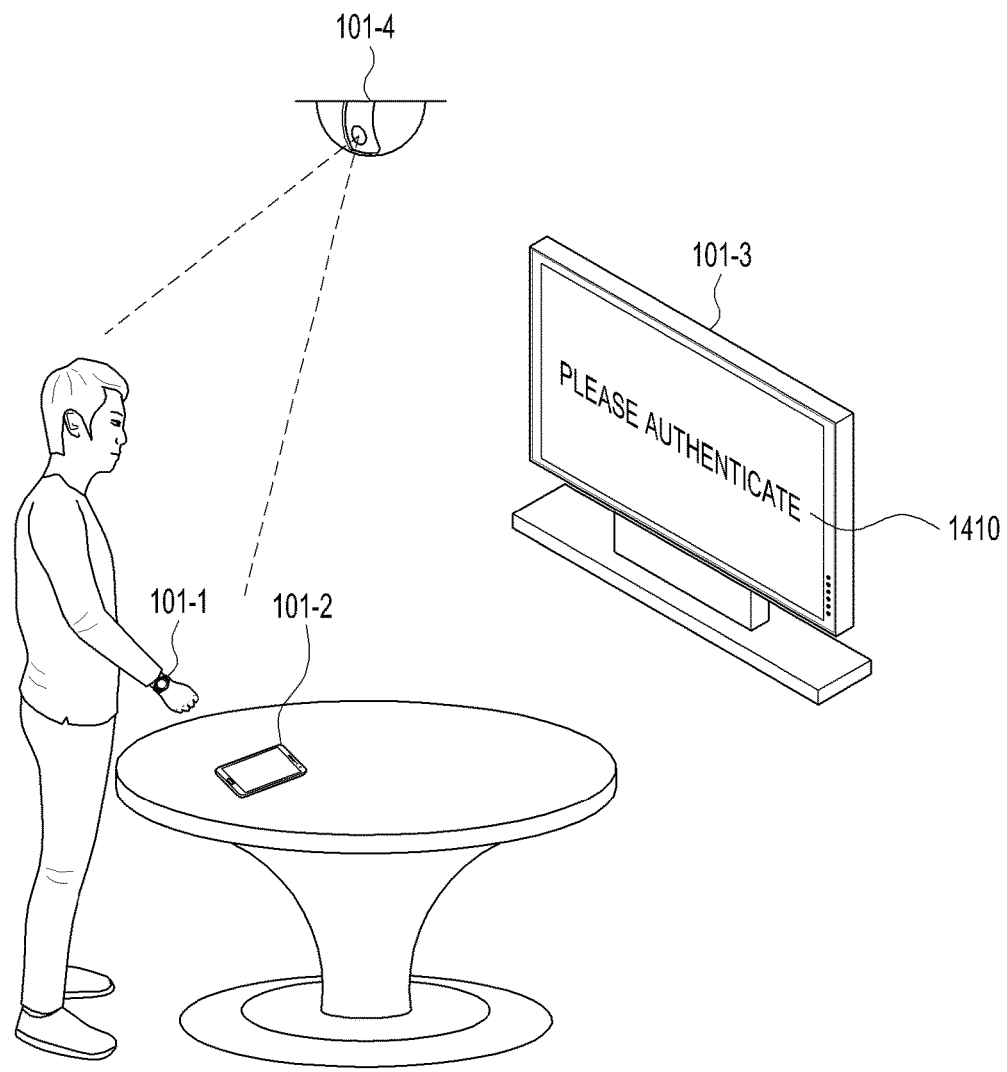
FIGS. 14A and 14B are diagrams illustrating an example operation of an electronic device in an IoT environment according to various example embodiments of the present disclosure.
Figure 14B:
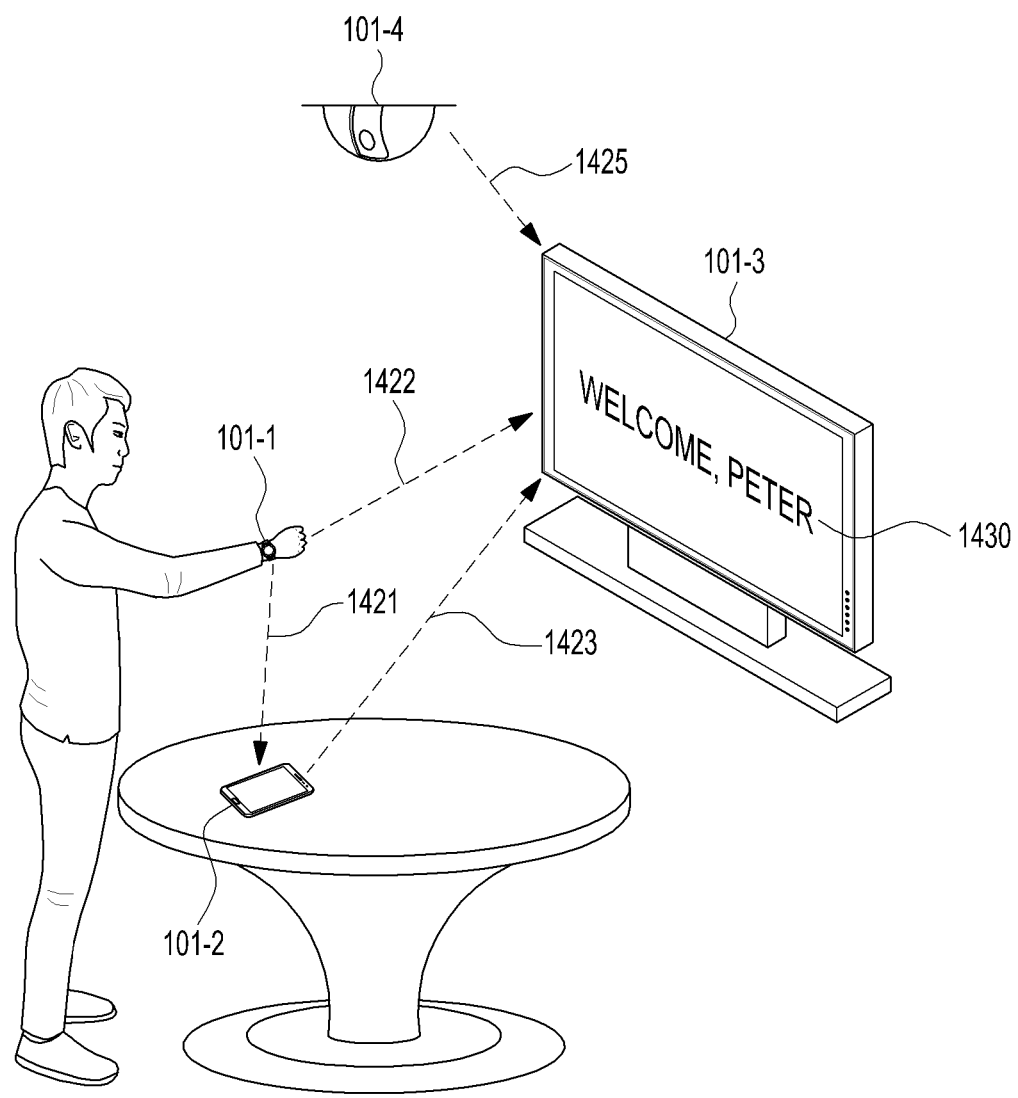

FIG. 13 is a flowchart illustrating an example method of controlling an electronic device in an Internet of Things (IoT) environment according to various example embodiments of the present disclosure. The example embodiment of FIG. 13 will be described in greater detail below with reference to FIGS. 14A and 14B. FIGS. 14A and 14B are diagrams illustrating an example operation of the electronic device in the IoT environment according to various example embodiments of the present disclosure.

In operation 1310, the first electronic device 101-1 may share virtual biometric information with the second electronic device 101-2 and the third electronic device 101-3. It is assumed that operation 1310 is performed at a time when biometric information and virtual biometric information are registered.

According to various example embodiments of the present disclosure, the first electronic device 101-1 may acquire biometric information at the time when the biometric information is registered, and generate virtual biometric information corresponding to the acquired biometric information. The first electronic device 101-1 may share relevant information between user-specific biometric information and virtual biometric information with other electronic devices 101-2 and 101-3. According to another example embodiment, the first electronic device 101-1 may share user-specific virtual biometric information with other electronic devices 101-2 and 101-3.

For example, as illustrated in FIG. 14A, the first electronic device 101-1 may share relevant information between user-specific biometric information and virtual biometric information or user-specific virtual biometric information with other electronic devices 101-2, 101-3, and 101-4. For example, the first electronic device 101-1 may be implemented as a wrist watch type wearable electronic device, and may sense a user's vein shape and share virtual biometric information corresponding to the user's vein shape with other electronic devices 101-2, 101-3, and 101-4. In the example embodiment of FIG. 14, it is assumed that the electronic device shares only virtual biometric information with other electronic devices. For example, virtual biometric information of a first user that the first electronic device 101-1 shares with other electronic devices 101-2, 101-3, and 101-4 may be as shown in Table 5.

TABLE 5

| User | Biometric information type | Biometric information (virtual biometric information) |
|---|---|---|
| First user | Vein shape | 010-1234-1111 |

As shown in Table 5, the first electronic device 101-1 may generate a phone number allocated to the first electronic device 101-1 as virtual biometric information on the vein shape and share the phone number with other electronic devices 101-2, 101-3, and 101-4. Meanwhile, the first electronic device 101-1 may store relevant information between the vein shape and the virtual biometric information.

Further, the fourth electronic device 101-4 may include a camera and sense a user's face shape and a gait habit as the biometric information. The fourth electronic device 101-4 may determine virtual biometric information corresponding to the biometric information such as the user's face shape or the user's gait habit and share the virtual biometric information with other electronic devices 101-1, 101-2, and 101-3.

For example, the virtual biometric information of the first user which the fourth electronic device 101-4 shares with the other electronic devices 101-1, 101-2, and 101-3 may be as shown in Table 6.

TABLE 6

| User | Biometric information type | Virtual biometric information |
|---|---|---|
| First user | Face shape | 0100011011 |
| | Gait habit | 11.22.33.44.55.66 |

As shown in Table 6, the fourth electronic device 101-4 may determine a dummy value of which uniqueness is guaranteed as the virtual biometric information of the face shape, determine a MAC address allocated to the fourth electronic device 101-4 as the virtual biometric information of the gait habit, and share the determined virtual biometric information with the other electronic devices 101-1, 101-2, and 101-3. Meanwhile, the fourth electronic device 101-4 may store relevant information between the face shape and gait habit, and the virtual biometric information.

Accordingly, all the electronic devices 101-1 to 101-4 within the system may store user-specific virtual biometric information as shown in Table 7.

TABLE 7

| User | Biometric information type | Virtual biometric information |
|---|---|---|
| First user | Vein shape | 010-1234-1111 |
| | Face shape | 0100011011 |
| | Gait habit | 11.22.33.44.55.66 |

Referring back to FIG. 13, in operation 1320, the first electronic device 101-1 may sense or acquire biometric information. In the example embodiment of FIG. 13, it is assumed that operation 1310 is performed at a registration time and operations after operation 1320 are performed in an authentication process. According to various example embodiments of the present disclosure, the first electronic device 101-1 may provide a user interface that induces the user to input biometric information and sense the biometric information. Meanwhile, according to another example embodiment, the first electronic device 101-1 may sense the biometric information from the user without consciousness of the user.

For example, as illustrated in FIG. 14B, a host device (for example, the third electronic device 101-3) that authenticates the user may transmit a user authentication command to the first electronic device 101-1 and the fourth electronic device 101-4, and the first electronic device 101-1 and the fourth electronic device 101-4 may authenticate the user. The host device (for example, the third electronic device 101-3) may output an authentication request screen 1430.

In operation 1330, the first electronic device 101-1 may determine whether the acquired biometric information is the same as pre-stored biometric information. In operation 1340 the first electronic device 101-1 may determine virtual biometric information corresponding to the acquired biometric information. In operation 1350 and operation 1360, the first electronic device 101-1 may transmit virtual biometric information to the host device (for example, the third electronic device 101-3) or another electronic device (for example, the second electronic device 101-2). Further, in operation 1370, the second electronic device 101-2 may transmit the received virtual biometric information to the host device (for example, the third electronic device 101-3).

For example, as illustrated in FIG. 14B, the first electronic device 101-1 may sense the user's vein shape. The first electronic device 101-1 may transmit virtual biometric information 1422 corresponding to the sensed vein shape (for example, "010-1234-1111") to the host device (for example, the third electronic device 101-3) based on relevant information between the pre-stored vein shape and the virtual biometric information.

When the first electronic device 101-1 is connected only to the second electronic device 101-2 through short-range communication such as Bluetooth communication, the first electronic device 101-1 may transmit virtual biometric information 1421 to the second electronic device 101-2 and the second electronic device 101-2 may transmit virtual biometric information 1423 to the third electronic device 101-3.

Further, the fourth electronic device 101-4 may transmit virtual biometric information 1425 corresponding to the sensed face shape and the gait habit (for example, "0100011011" and "11.22.33.44.55.66") based on relevant information between the pre-stored face shape and gait habit, and the virtual biometric information to the third electronic device 101-3.

Accordingly, the host device (for example, the third electronic device 101-3) may receive "010-1234-1111" 1422, and "0100011011" and "11.22.33.44.55.66" 1425. The host device (for example, the third electronic device 101-3) may compare the pre-stored user-specific virtual biometric information as shown in Table 7 and the received virtual biometric information 1422 and 1425 and determine that a target to be authenticated is a first user. The host device (for example, the third electronic device 101-3) may output an identified authentication screen 1430.

As described above, the host device in the IoT environment may receive virtual biometric information corresponding to various pieces of biometric information from electronic devices including various types of sensors and authenticate the user. Particularly, when information sharing is frequently generated like in the IoT environment, security may be more focused on as virtual biometric information is used instead of biometric information.

Figure 15:
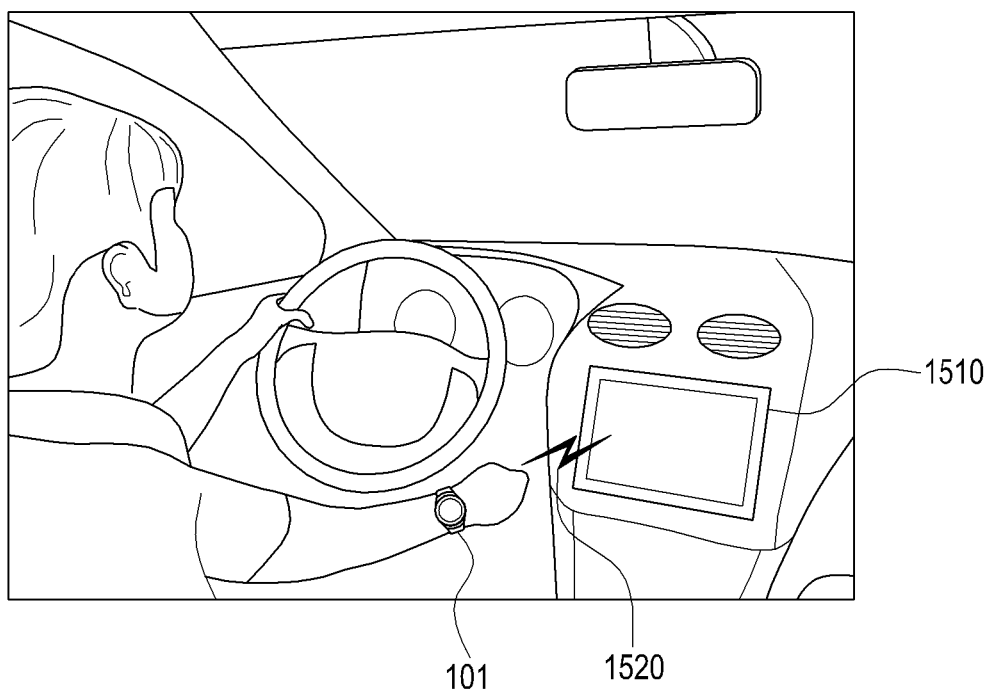
FIG. 15 is a diagram illustrating an example user authentication process in a car.

FIG. 15 is a diagram illustrating an example user authentication process in a car.

As illustrated in FIG. 15, the car may include an electronic system 1510 for performing a user authentication. The electronic system 1510 may control at least one other electronic device included in the car based on a result of the performance of the user authentication. The electronic system 1510 may communicate with the electronic device 101. Meanwhile, at a time when biometric information of the user is registered, the electronic device 101 may acquire the biometric information and store the biometric information to be linked with virtual biometric information corresponding to the biometric information. Further, the electronic device 101 may share relevant information between user-specific biometric information and virtual biometric information with the electronic system 1510. In addition, the electronic device 101 may share the user-specific virtual biometric information with the electronic system 1510.

Meanwhile, at a time when the user is authenticated, the electronic device 101 may sense a biometric feature from the user. For example, the electronic device 101 may sense the user's vein shape as the biometric feature. The electronic device 101 may determine virtual biometric information corresponding to the acquired vein shape and transmit virtual biometric information 1520 to the electronic system 1510. The electronic system 1510 may compare the received virtual biometric information 1520 with pre-stored virtual biometric information and authenticate the user based on a result of the comparison. Accordingly, even though a sensor for sensing the biometric information is not included in the car, the user authentication using the biometric information is possible.

Figure 16:
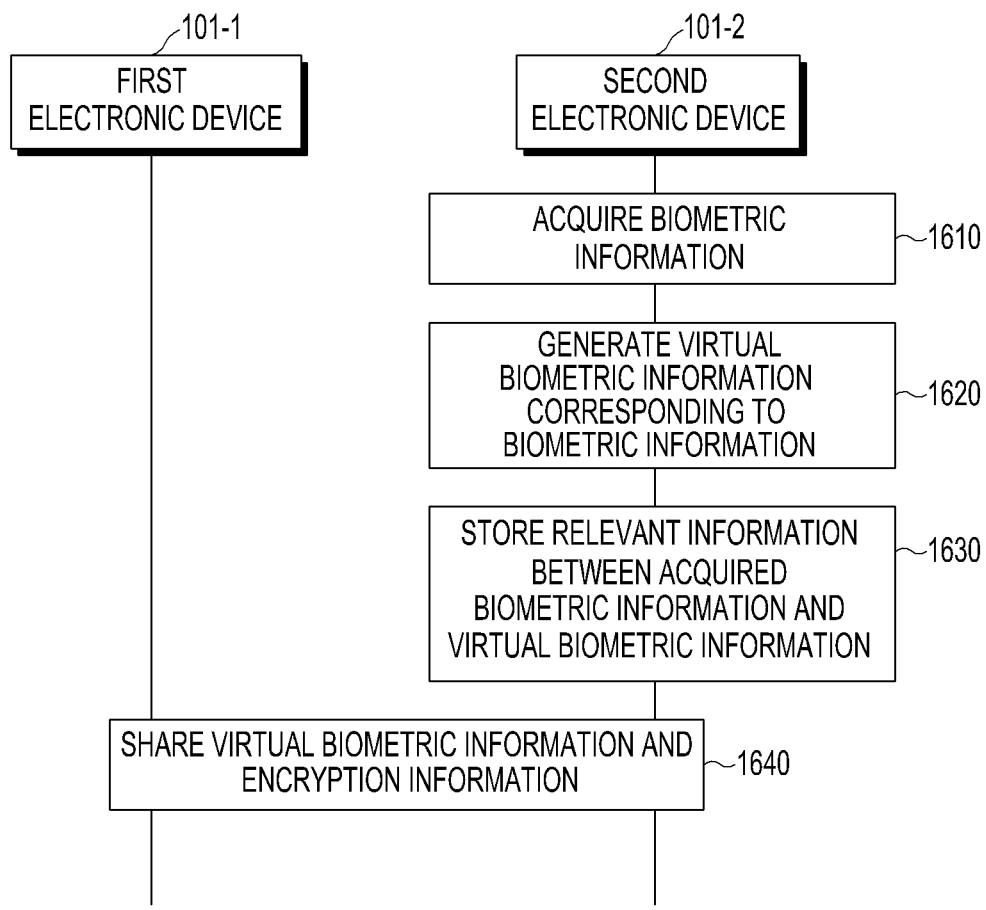
FIG. 16 is a flowchart illustrating an example biometric information registration process of an electronic device according to various example embodiments of the present disclosure.

FIG. 16 is a flowchart illustrating an example biometric information registration process of the electronic device according to various example embodiments of the present disclosure.

In operation 1610, the second electronic device 101-2 may acquire biometric information at, for example, a time when the biometric information is registered. In operation 1620, the second electronic device 101-2 may generate virtual biometric information corresponding to the biometric information. As described above, the second electronic device 101-2 may generate, as the virtual biometric information, a value which is different from the biometric information and of which uniqueness is guaranteed.

In operation 1630, the second electronic device 101-2 may store relevant information between the acquired biometric information and the virtual biometric information. In operation 1640, the second electronic device 101-2 may share the virtual biometric information and encryption information with the first electronic device 101-1. The first electronic device 101-1 may store user-specific virtual biometric information and encryption information.

Figure 17:
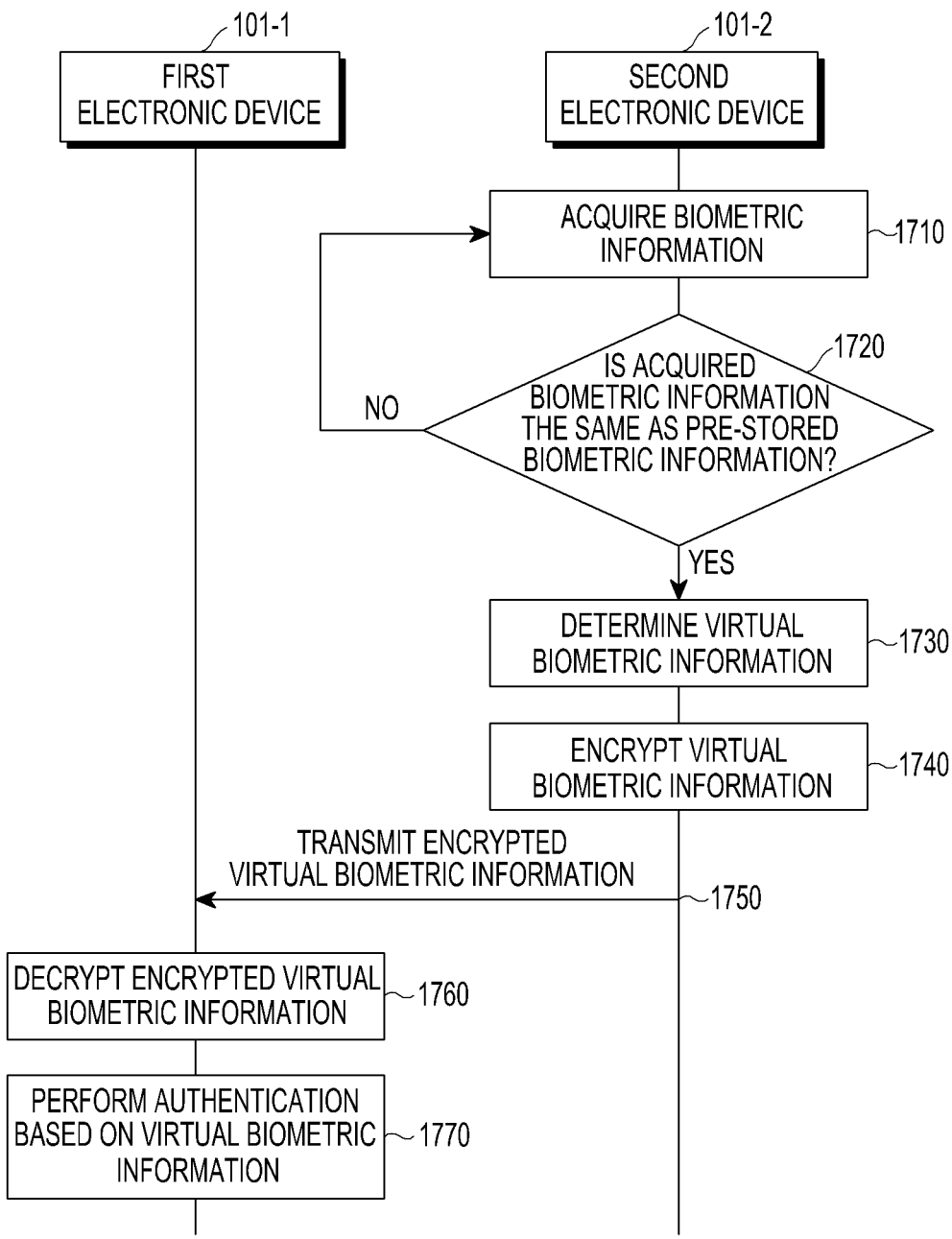
FIG. 17 is a flowchart illustrating an example user authentication process of an electronic device according to various example embodiments of the present disclosure.

FIG. 17 is a flowchart illustrating an example user authentication process of the electronic device according to various example embodiments of the present disclosure.

In operation 1710, the second electronic device 101-2 may acquire biometric information at, for example, a time when the user is authenticated. In operation 1720, the second electronic device 101-2 may determine whether the acquired biometric information is the same as pre-stored biometric information. When the acquired biometric information is the same as the pre-stored biometric information, the second electronic device 101-2 may determine virtual biometric information corresponding to the pre-stored biometric information in operation 1730.

In operation 1740, the second electronic device 101-2 may encrypt the virtual biometric information. The second electronic device 101-2 may encrypt the virtual biometric information using, for example, the encryption information which the second electronic device 101-2 shares with the first electronic device 101-1 in FIG. 16. In operation 1750, the second electronic device 101-2 may transmit the encrypted virtual biometric information to the first electronic device 101-1.

In operation 1760, the first electronic device 101-1 may decrypt the encrypted virtual biometric information. For example, the first electronic device 101-1 may decrypt the encrypted virtual biometric information by using the encryption information received from the second electronic device 101-2 in FIG. 16. In operation 1770, the first electronic device 101-1 may authenticate the user based on the virtual biometric information.

As described above, the electronic device according to various example embodiments of the present disclosure may encrypt the virtual biometric information and then transmit the encrypted virtual biometric information, thereby increasing security of the virtual biometric information.

Figure 18:
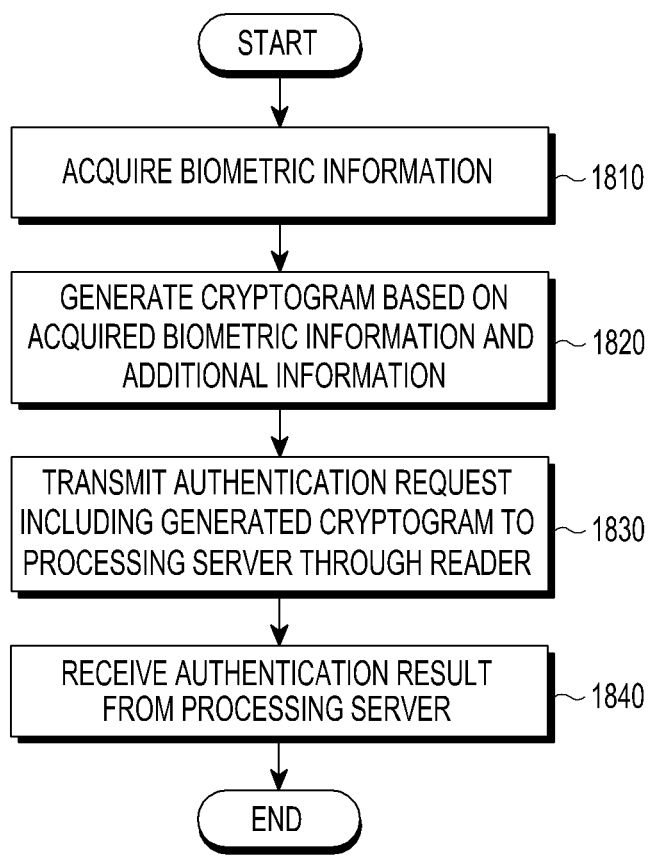
FIG. 18 is a flowchart illustrating an example method of controlling an electronic device according to a comparative example for a comparison with the present disclosure.

FIG. 18 is a flowchart illustrating an example method of controlling the electronic device according to a comparative example for a comparison with the present disclosure.

In operation 1810, the electronic device according to the comparative example may acquire biometric information. In operation 1820, the electronic device according to the comparative example may generate a cryptogram based on the acquired biometric information and additional information. The additional information may be added information used for a user authentication such as a credit card number.

In operation 1830, the electronic device according to the comparative example may transmit an authentication request including the generated cryptogram to a processing server through a reader. The processing server may decrypt the cryptogram and authenticate the user based on the biometric information sensed by the electronic device. In operation 1840, the electronic device according to the comparative example may receive a result of the authentication from the processing server. In this example, the biometric information may be encrypted with other additional information and transmitted to the processing server, but the biometric information may be leaked during the transmission process.

Figure 19:
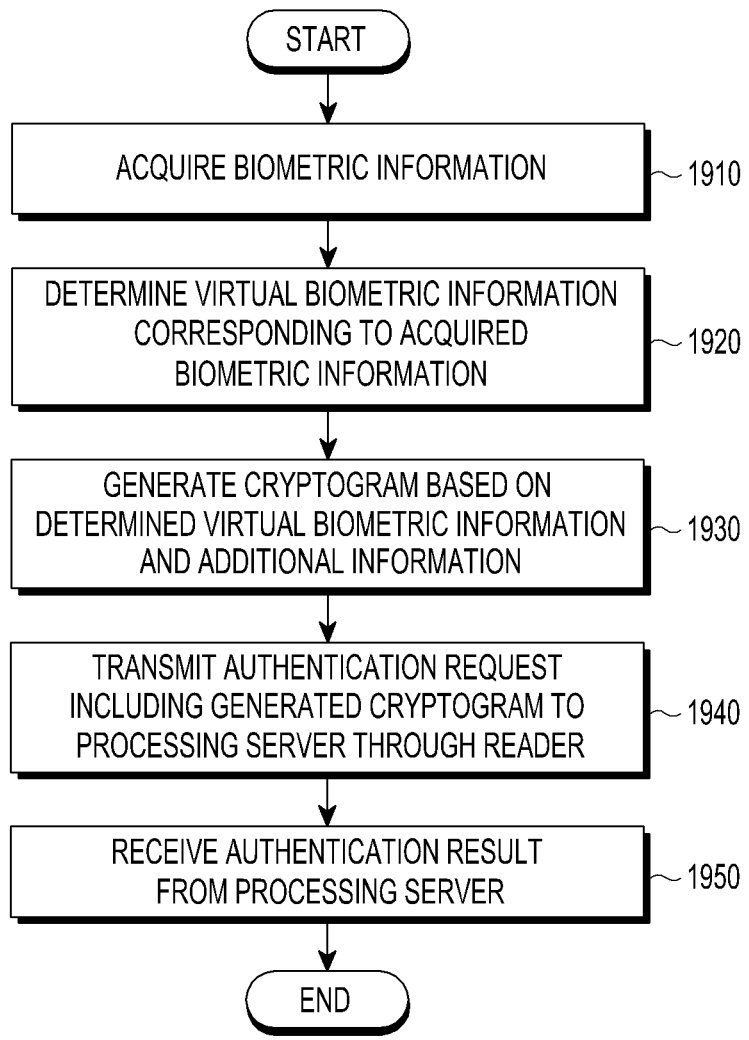
FIG. 19 is a flowchart illustrating an example method of controlling an electronic device according to various example embodiments of the present disclosure.
Figure 20:
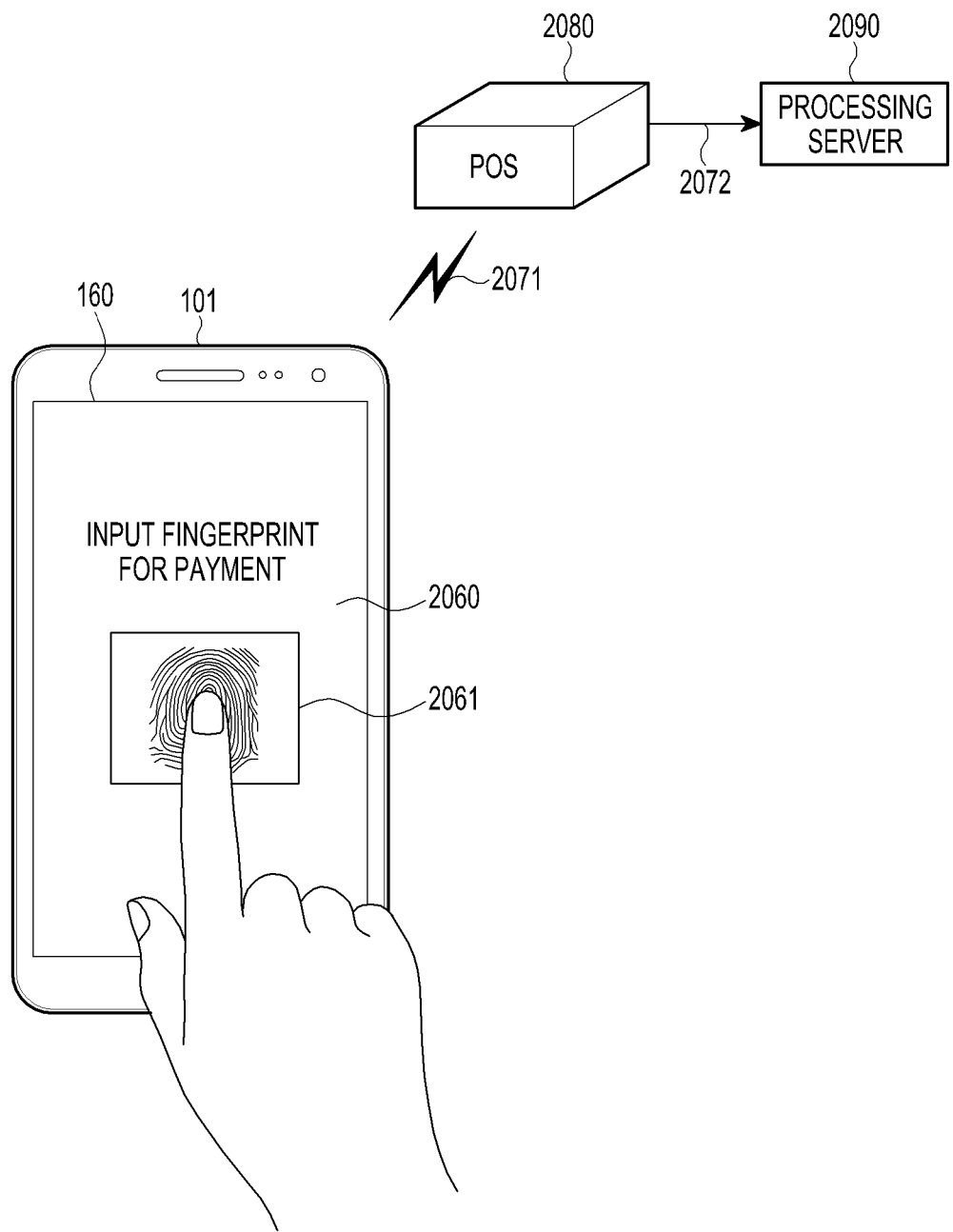
FIG. 20 is a diagram illustrating an example operation of an electronic device according to various example embodiments of the present disclosure.

FIG. 19 is a flowchart illustrating an example method of controlling the electronic device according to various example embodiments of the present disclosure. The embodiment of FIG. 19 will be described in greater detail below with reference to FIG. 20. FIG. 20 is a diagram illustrating an example operation of the electronic device according to various example embodiments of the present disclosure.

In operation 1910, the electronic device 101 may acquire biometric information. For example, as illustrated in FIG. 20, the electronic device 101 may display a user interface 2060 on the display 160 that induces acquisition of biometric features, for example, fingerprint information. The user may input the biometric feature, for example, fingerprint information through the user interface 2060. The electronic device 101 may display acquired fingerprint information 2061 to aid in the user recognition.

In operation 1920, the electronic device 101 may determine virtual biometric information corresponding to the acquired biometric information. For example, in the example embodiment of FIG. 20, it is assumed that the electronic device 101 completes biometric information registration and stores relevant information between user-specific biometric information and virtual biometric information. The electronic device 101 may determine whether there is pre-stored biometric information that is the same as the acquired biometric information. When there is the biometric information that is the same as the acquired biometric information, the electronic device 101 may determine virtual biometric information corresponding to the corresponding biometric information.

In operation 1930, the electronic device 101 may generate a cryptogram based on the determined virtual biometric information and additional information. The additional information may be information used in electronic commerce such as a credit card number. The electronic device 101 may, for example, store an electronic commerce algorithm that performs an encryption based on the additional information and the biometric information in advance and generate a cryptogram through the electronic commerce algorithm. For example, while the cryptogram according to the comparative example is generated based on the biometric information and the additional information such as the credit card number, the cryptogram according to the present disclosure may be generated based on the virtual biometric information and the additional information.

In operation 1940, the electronic device 101 may transmit an authentication request including the generated cryptogram to a processing server 2090 through a reader 2080. The reader 2080 may receive a cryptogram 2071 from the electronic device 101 based on, for example, short-range communication such as Near Field Communication (NFC) or Magnetic Secure Transfer (MST) communication. The reader 2080 may transmit the received cryptogram 2072 to the processing server 2090. In operation 1950, the electronic device 101 may receive a result of the authentication from the processing server 2090. For example, the processing server 2090 may decrypt the received cryptogram 2072 to acquire virtual biometric information and additional information, and authenticate the user based on the acquired virtual biometric information and additional information. The processing server 2090 may determine whether to conduct the electronic commerce based on a result of the performance of the user authentication.

As described above, the electronic device 101 according to various example embodiments of the present disclosure may generate the cryptogram based on both the additional biometric information and other additional information and use the generated cryptogram for the user authentication as well as directly encrypting the virtual biometric information.

Figure 21:
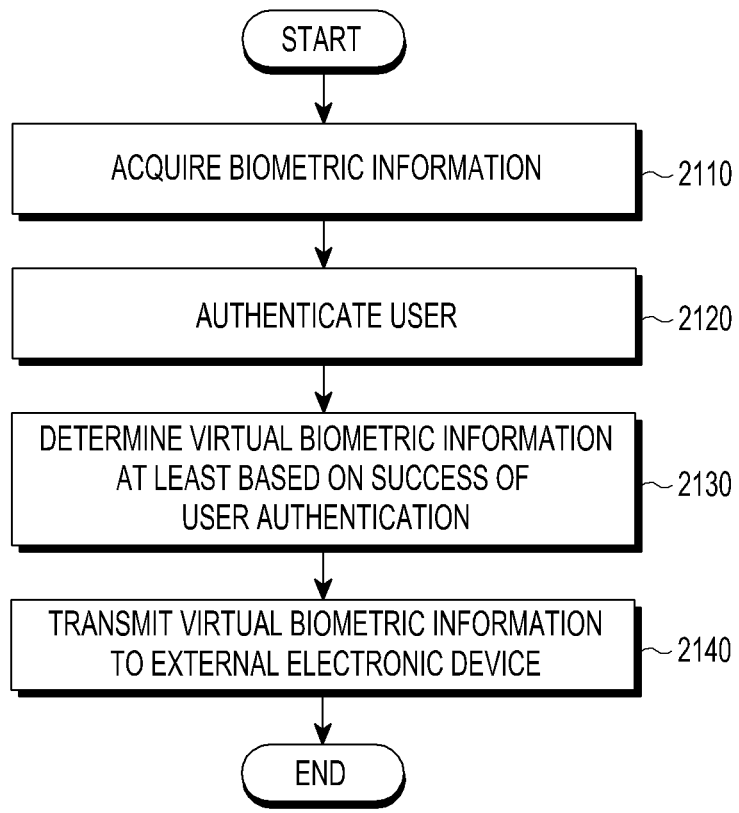
FIG. 21 is a flowchart illustrating an example operation of an electronic device according to various example embodiments of the present disclosure.

FIG. 21 is a flowchart illustrating an example method of controlling the electronic device according to various example embodiments of the present disclosure.

In operation 2110, the electronic device 101 may acquire biometric information. In operation 2120, the electronic device 101 may authenticate the user at least based on the acquired biometric information. For example, the electronic device 101 may store relevant information between user-specific biometric information and virtual biometric information before the user authentication. The electronic device 101 may authenticate the user based on whether the acquired biometric information exists in the relevant information.

In operation 2130, the electronic device may determine virtual biometric information to be used for the user authentication in at least one external electronic device at least based on the determination that the user is successfully authenticated. The electronic device may determine virtual biometric information based on a comparison result between the pre-stored relevant information and the acquired biometric information. In operation 2140, the electronic device may transmit virtual biometric information to at least one external electronic device.

Figure 22:
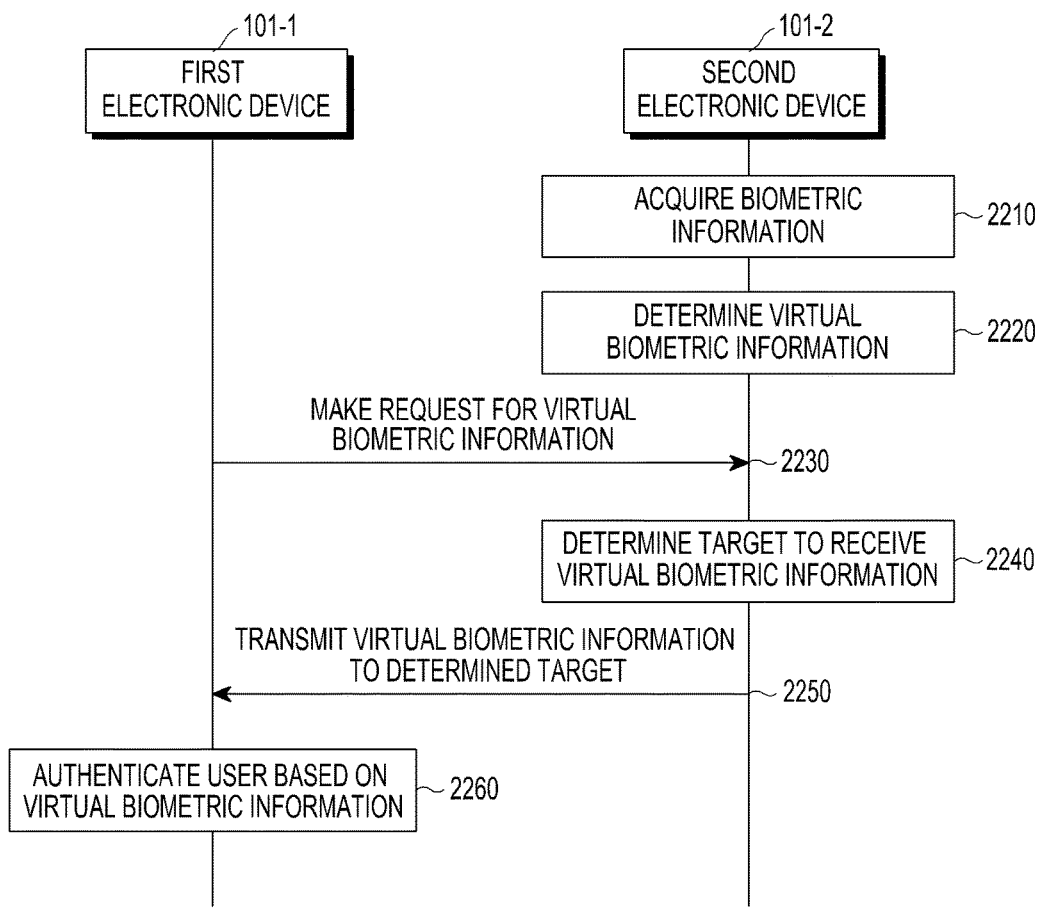
FIG. 22 is a flowchart illustrating an example operation of an electronic device according to various example embodiments of the present disclosure.

FIG. 22 is a flowchart illustrating an example method of controlling the electronic device according to various example embodiments of the present disclosure. In the example embodiment of FIG. 22, it is assumed that the first electronic device 101-1 is a host electronic device and the second electronic device 101-2 is a client electronic device.

In operation 2210, the second electronic device 101-2 may acquire biometric information at, for example, a time when the user is authenticated. The second electronic device 101-2 may determine virtual biometric information corresponding to the acquired biometric information based on the relevant information between the pre-stored biometric information and the virtual biometric information in operation 2220.

In operation 2230, the second electronic device 101-2 may receive a request for virtual biometric information from, for example, the first electronic device 101-1. In operation 2240, the second electronic device 101-2 may determine the first electronic device 101-1 having transmitted a request as a target to which the virtual biometric information is transmitted. According to another example embodiment, operation 2230 may not be performed. In this example, the second electronic device 101-2 may determine the target to which the virtual biometric information is transmitted by itself. For example, the second electronic device 101-2 may determine an electronic device that does not include a sensing module for sensing the corresponding biometric information as the target to which the virtual biometric information is transmitted based on a type of the acquired biometric information. The second electronic device 101-2 may determine an electronic device having an inactive sensing module for sensing the acquired biometric information as the target to which the virtual biometric information is transmitted. The second electronic device 101-2 may determine a host device as the target to which the virtual biometric information is transmitted.

In operation 2250, the second electronic device 101-2 may transmit the virtual biometric information to the determined target (for example, the first electronic device 101-1). In operation 2260, the first electronic device 101-1 may authenticate the user by comparing the received virtual biometric information with the pre-stored virtual biometric information.

A method of controlling an electronic device according to various example embodiments of the present disclosure may include: an operation of acquiring biometric information of a user; an operation of generating virtual biometric information corresponding to the acquired biometric information; and an operation of transmitting the virtual biometric information to an external electronic device.

The method of controlling the electronic device according to various example embodiments of the present disclosure may further include: an operation of acquiring other biometric information to be registered in at least one of the external electronic device and the electronic device; an operation of generating virtual biometric information corresponding to the other biometric information; and an operation of sharing the generated virtual biometric information with the external electronic device before a user authentication.

The method of controlling the electronic device according to various example embodiments of the present disclosure may further include an operation of storing relevant information between the other biometric information and the virtual biometric information according to each user.

The operation of determining the virtual biometric information corresponding to the acquired biometric information according to various example embodiments of the present disclosure may include an operation of comparing the acquired biometric information and the relevant information and determining the virtual biometric information corresponding to the acquired biometric information.

The operation of determining the virtual biometric information corresponding to the acquired biometric information according to various example embodiments of the present disclosure may include an operation of, when the acquired biometric information and the other biometric information are equal to each other, determining the virtual biometric information corresponding to the other biometric information as the virtual biometric information.

The operation of generating the virtual biometric information according to various example embodiments of the present disclosure may include: an operation of providing a plurality of pieces of data to generate the virtual biometric information; and an operation of generating the virtual biometric information based on at least one selected from the plurality of pieces of data.

A method of controlling an electronic device according to various example embodiments of the present disclosure may include: an operation of acquiring user's biometric information through the biometric sensor, an operation of authenticating a user at least based on the biometric information, an operation of determining virtual biometric information to be used for authenticating the user by at least one external electronic device at least based on a determination that the user is successfully authenticated, and an operation of transmitting the virtual biometric information to the at least one eternal electronic device through the communication module.

The operation of generating the virtual biometric information according to various example embodiments of the present disclosure may include an operation of selecting an external device having no sensor for acquiring the biometric information or an inactive external device as the at least one external electronic device.

The operation of generating the virtual biometric information according to various example embodiments of the present disclosure may include: an operation of receiving a request for the virtual biometric information from the external electronic device; and an operation of transmitting the virtual biometric information to the external electronic device having transmitted the request.

The method of controlling the electronic device according to various example embodiments of the present disclosure may further include an operation of generating the virtual biometric information based on the biometric information and identification information of the electronic device before the user is authenticated.

Each of the components of the electronic device according to the present disclosure may be implemented by one or more components and the name of the corresponding component may vary depending on a type of the electronic device. In various example embodiments, the electronic device may include at least one of the above-described elements. Some of the above-described elements may be omitted from the electronic device, or the electronic device may further include additional elements. Further, some of the components of the electronic device according to the various example embodiments of the present disclosure may be combined to form a single entity, and thus, may equivalently execute functions of the corresponding elements prior to the combination.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof.

The "module" may be the smallest unit that performs one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various example embodiments of the present disclosure, a storage medium storing instructions is provided. The instructions are configured to cause at least one processor to perform at least one operation when being executed by the at least one processor. The at least one operation may include: an operation of acquiring biometric information of a user; an operation of determining virtual biometric information corresponding to the acquired biometric information; and an operation of transmitting the virtual biometric information to an external electronic device.

Various example embodiments disclosed herein are provided merely to easily describe technical details of the present disclosure and to aid in understanding of the present disclosure, and are not intended to limit the scope of the present disclosure. Therefore, it should be understood that all modifications and changes or modified and changed forms based on the technical idea of the present disclosure fall within the scope of the present disclosure.

What is claimed is:

1. An electronic device comprising:
   a sensor;
   a communication module comprising communication circuitry;
   a processor electrically connected to the sensor and the communication module; and
   a memory electrically connected to the processor,
   wherein the memory stores instructions that, when executed by the processor, cause the processor to perform operations comprising:
      displaying a screen requesting input of biometric information,
      acquiring, via the sensor, biometric information of a user,
      identifying whether the biometric information corresponds to a pre-stored biometric information,
      determining virtual biometric information corresponding to the acquired biometric information according to a result of the identification, and
      causing transmitting, via the communication module, the virtual biometric information to an external electronic device for completing an authentication,
      wherein the biometric information is different from the virtual biometric information.

2. The electronic device of claim 1, wherein the operations further comprise: acquiring other biometric information to be registered in at least one of the external electronic device and the electronic device, generating virtual biometric information corresponding to the other biometric information, and sharing the generated virtual biometric information with the external electronic device through the communication circuitry before a user authentication.

3. The electronic device of claim 2, wherein the operations further comprise: storing relevant information between the other biometric information and the virtual biometric information based on each user.

4. The electronic device of claim 3, wherein the operations further comprise: comparing the acquired biometric information with the relevant information and determining the virtual biometric information corresponding to the acquired biometric information.

5. The electronic device of claim 4, wherein the operations further comprise: determining the virtual biometric information corresponding to the other biometric information as the virtual biometric information when the acquired biometric information is identical to the other biometric information.

6. The electronic device of claim 3, wherein the operations further comprise: acquiring other virtual biometric information for updating the virtual biometric information, replacing the virtual biometric information with the other virtual biometric information to update the relevant information, and transmitting the other virtual biometric information to the external electronic device through the communication circuitry.

7. The electronic device of claim 2, wherein the operations further comprise transmitting generated user-specific virtual biometric information to the external electronic device through the communication circuitry, and
   wherein the external electronic device stores the user-specific virtual biometric information received from the electronic device before the user authentication and compares the virtual biometric information with the pre-stored user-specific virtual biometric information to perform the user authentication.

8. The electronic device of claim 2, wherein the operations further comprise: transmitting encryption information for encrypting the virtual biometric information to the external electronic device through the communication circuitry, and encrypting the virtual biometric information based on the encryption information and transmitting the encrypted virtual biometric information to the external electronic device through the communication circuitry.

9. The electronic device of claim 8, wherein the operations further comprise: encrypting the virtual biometric information and additional information based on the encryption information and transmitting the encrypted virtual biometric information and additional information to the external electronic device through the communication circuitry.

10. The electronic device of claim 2, wherein the operations further comprise: providing a plurality of pieces of data for generating the virtual biometric information and generating the virtual biometric information based on at least one selected from the plurality of pieces of data.

11. A method of controlling an electronic device, the method comprising:
    displaying a screen requesting input of biometric information,
    acquiring, via a sensor of the electronic device, biometric information of a user;
    identifying whether the biometric information corresponds to a pre-stored biometric information,
    determining virtual biometric information corresponding to the acquired biometric information according to a result of the identification; and
    transmitting, by the electronic device, the virtual biometric information to an external electronic device for completing an authentication,
    wherein the biometric information is different from the virtual biometric information.

12. The method of claim 11, further comprising:
    acquiring other biometric information to be registered in at least one of the external electronic device and the electronic device;

generating virtual biometric information corresponding to the other biometric information; and sharing the generated virtual biometric information with the external electronic device before a user authentication.

13. The method of claim 12, further comprising storing relevant information between the other biometric information and the virtual biometric information based on each user.

14. The method of claim 13, wherein the determining of the virtual biometric information corresponding to the acquired biometric information comprises: comparing the acquired biometric information and the relevant information; and determining the virtual biometric information corresponding to the acquired biometric information.

15. The method of claim 14, wherein the determining of the virtual biometric information corresponding to the acquired biometric information comprises: determining the virtual biometric information corresponding to the other biometric information as the virtual biometric information when the acquired biometric information and the other biometric information are equal to each other.

16. The method of claim 12, wherein the generating of the virtual biometric information comprises:
providing a plurality of pieces of data to generate the virtual biometric information; and
generating the virtual biometric information based on at least one selected from the plurality of pieces of data.

17. An electronic device comprising:
a sensor;
a communication module comprising communication circuitry; and
a processor functionally connected to the sensor and the communication module, wherein the processor is configured to:
receive, from an external electronic device, a signal requesting first information configured to be used for authentication at the external electronic device, through the communication module;
in response to receiving the signal requesting the first information, cause to be displayed a screen requesting input of biometric information,
acquire, via the sensor, biometric information of a user while displaying the screen requesting input of biometric information,
identifying whether the biometric information corresponds to a pre-stored biometric information, and
in response to identifying that the biometric information corresponds to the pre-stored biometric information, transmit, via the communication module, the first information to an external electronic device for completing the authentication,
wherein the biometric information of the user is different from the first information.

18. The electronic device of claim 17, wherein the processor is configured to obtain the first information according to a result of the identification.

19. The electronic device of claim 17, wherein the processor is configured to generate the first information based on at least one of the biometric information and identification information of the electronic device.

* * * * *